US012580389B2

(12) United States Patent
Sun et al.

(10) Patent No.: US 12,580,389 B2
(45) Date of Patent: Mar. 17, 2026

(54) CHARGING APPARATUS, CHARGING APPARATUS CONTROL METHOD, AND CHARGING SYSTEM

(71) Applicant: HUAWEI DIGITAL POWER TECHNOLOGIES CO., LTD., Shenzhen (CN)

(72) Inventors: Chenghao Sun, Dongguan (CN); Chengyong Liu, Dongguan (CN); Jie Ren, Shenzhen (CN); Xue Zhang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 841 days.

(21) Appl. No.: 17/955,290

(22) Filed: Sep. 28, 2022

(65) Prior Publication Data

US 2023/0013471 A1      Jan. 19, 2023

Related U.S. Application Data

(63) Continuation of application No. PCT/CN2021/078780, filed on Mar. 2, 2021.

(30) Foreign Application Priority Data

Apr. 10, 2020   (CN) .......................... 202010279469.9

(51) Int. Cl.
*H02J 7/00* (2006.01)
*H01M 10/44* (2006.01)
(Continued)

(52) U.S. Cl.
CPC .............. *H02J 7/06* (2013.01); *H01M 10/44* (2013.01); *H02J 7/0029* (2013.01); (Continued)

(58) Field of Classification Search
CPC .............................. H02J 7/0029; H02M 1/344
(Continued)

(56) References Cited

U.S. PATENT DOCUMENTS

2018/0287481 A1   10/2018   Liu et al.
2019/0074765 A1   3/2019   Hari et al.
(Continued)

FOREIGN PATENT DOCUMENTS

CN      1604440 A      4/2005
CN    102122890 A      7/2011
(Continued)

OTHER PUBLICATIONS

Lin et al., "Active-Clamp Forward Converter With Lossless-Snubber on Secondary-Side," IEEE Transactions On Power Electronics, vol. 34, No. 8, Aug. 2019, 12 pages.
(Continued)

*Primary Examiner* — Ahmed H Omar
(74) *Attorney, Agent, or Firm* — Fish & Richardson P.C.

(57) ABSTRACT

Embodiments of this application provide charging apparatuses, charging apparatus control methods, and charging systems, and relate to the field of terminal device charging technologies. The charging apparatus includes a rectifier circuit, a transformer, a lower bridge switch, a clamp capacitor, an upper bridge switch, and a controller. The transformer includes a primary coil and at least one secondary coil. The controller is configured to control the upper bridge switch and the lower bridge switch to be alternatively turned on. The controller is further configured to obtain a sampling waveform at a location at which the controller is electrically connected to the transformer when the lower bridge switch is turned off, and, when the sampling waveform is abnormal, turn off the lower bridge switch in a first phase of a next charging cycle. The sampling waveform includes a voltage (Continued)

waveform of the primary coil or a voltage waveform of the secondary coil.

20 Claims, 14 Drawing Sheets

(51) Int. Cl.

| | |
|---|---|
| *H02J 7/06* | (2006.01) |
| *H02M 3/335* | (2006.01) |
| *H02M 7/06* | (2006.01) |

(52) U.S. Cl.
CPC ......... *H02M 3/33507* (2013.01); *H02M 7/06* (2013.01); *H01M 2220/30* (2013.01); *H02J 2207/20* (2020.01)

(58) Field of Classification Search
USPC ........................................................ 320/137
See application file for complete search history.

(56) References Cited

U.S. PATENT DOCUMENTS

| | | | |
|---|---|---|---|
| 2019/0140550 A1* | 5/2019 | Song ................. | H02M 3/33592 |
| 2020/0091826 A1 | 3/2020 | Yang et al. | |
| 2021/0152094 A1* | 5/2021 | Wong ..................... | H02M 1/08 |

FOREIGN PATENT DOCUMENTS

| | | | |
|---|---|---|---|
| CN | 102307017 | A | 1/2012 |
| CN | 205213096 | U | 5/2016 |
| CN | 105716632 | A | 6/2016 |
| CN | 205911955 | U | 1/2017 |
| CN | 107181410 | A | 9/2017 |
| CN | 108988652 | A | 12/2018 |
| CN | 109639149 | A | 4/2019 |
| CN | 110794279 | A | 2/2020 |
| CN | 110829557 | A | 2/2020 |
| CN | 210120487 | U | 2/2020 |
| CN | 111525662 | A | 8/2020 |

OTHER PUBLICATIONS

Office Action in Chinese Appln. No. 202010279469.9, dated Jun. 15, 2021, 31 pages (with English translation).

International Search Report and Written Opinion in International Appln. No. PCT/CN2021/078780, mailed on May 28, 2021, 20 pages (with English translation).

Extended European Search Report in European Appln No. 21785177. 3, dated Jun. 27, 2023, 7 pages.

* cited by examiner

CHARGING APPARATUS, CHARGING APPARATUS CONTROL METHOD, AND CHARGING SYSTEM

CROSS-REFERENCE TO RELATED APPLICATIONS

This application is a continuation of International Application No. PCT/CN2021/078780, filed on Mar. 2, 2021, which claims priority to Chinese Patent Application No. 202010279469.9, filed on Apr. 10, 2020. The disclosures of the aforementioned applications are hereby incorporated by reference in their entireties.

TECHNICAL FIELD

This application relates to the field of terminal device charging technologies, and in particular, to a charging apparatus, a charging apparatus control method, and a charging system.

BACKGROUND

A relatively large quantity of half bridges are used in the charging apparatus field, such as an active clamp flyback (ACF) topology. However, there are some problems in a process of using a charging apparatus with a half bridge. For example, a voltage of a clamp capacitor in the half-bridge circuit structure is excessively high because an upper bridge switch is not turned on, and the voltage of the clamp capacitor exceeds a voltage withstand value of the clamp capacitor. As a result, a short circuit or an open circuit of the clamp capacitor may occur, and consequently there is a security risk such as firing or overheating.

SUMMARY

Embodiments of this application provide a charging apparatus, a charging apparatus control method, and a charging system, to avoid problems such as a short circuit or an open circuit that occurs when a voltage of a clamp capacitor is excessively high.

To achieve the foregoing objectives, the following technical solutions are used in this application.

According to a first aspect of the embodiments of this application, a charging apparatus is provided, where the charging apparatus is configured to supply power to a load. The charging apparatus includes a rectifier circuit, a transformer, a lower bridge switch, a clamp capacitor, and an upper bridge switch. The rectifier circuit is configured to rectify a received alternating current. The transformer is configured to buck an output voltage of the rectifier circuit and then provide a bucked output voltage to the load. In addition, the transformer includes a primary coil and at least one secondary coil, and a first end of the primary coil is electrically connected to the rectifier circuit. A first end of the lower bridge switch is electrically connected to a second end of the primary coil, and a second end of the lower bridge switch is electrically connected to a grounding end. The lower bridge switch is configured to be turned on in a first phase of a charging cycle of the charging apparatus, so that a current output by the rectifier circuit is transmitted to the primary coil, to charge the primary coil. In addition, a first end of the clamp capacitor is electrically connected to the first end of the primary coil. A first end of the upper bridge switch is electrically connected to a second end of the clamp capacitor. A second end of the upper bridge switch is electrically connected to the second end of the primary coil. The upper bridge switch is configured to be turned on in a second phase of the charging cycle, so that a leakage inductance in the primary coil charges the clamp capacitor, and the clamp capacitor discharges electricity to the primary coil. The charging apparatus further includes a controller. The processor is configured to control, in the first phase and the second phase, the upper bridge switch and the lower bridge switch to be alternatively turned on. The controller is further configured to: when the lower bridge switch is turned off, obtain a sampling waveform at a location at which the controller is electrically connected to the transformer; and when the sampling waveform in a current charging cycle is abnormal, turn off the lower bridge switch in a first phase of a next charging cycle. The sampling waveform includes a voltage waveform of the primary coil or a voltage waveform of the secondary coil. In this way, the leakage inductance in the primary coil is prevented from charging the clamp capacitor, thereby avoiding problems such as a short circuit or an open circuit that occurs when a voltage of the clamp capacitor is excessively high.

Optionally, the location at which the controller is electrically connected to the transformer is between the second end of the primary coil and the first end of the lower bridge switch, or between the second end of the upper bridge switch and the first end of the lower bridge switch. A voltage value of Vds is tested when the lower bridge switch is turned off, to determine whether the sampling waveform is an abnormal waveform.

Optionally, the transformer includes a first secondary coil, and the transformer further includes a first rectifier diode. A first end of the first secondary coil is electrically connected to an anode of the first rectifier diode, a cathode of the first rectifier diode is configured to be electrically connected to the load, and a second end of the first secondary coil is grounded. Based on this, the first secondary coil and the primary coil are configured to buck a voltage of the primary coil through electromagnetic induction, and generate a first output voltage. A sampling point at the location at which the controller is electrically connected to the transformer is at the first end of the first secondary coil. A voltage waveform of the first output voltage is synchronous with the voltage waveform of the primary coil. Therefore, when the lower bridge switch is turned off, a waveform graph of the first output voltage may be collected to determine whether the sampling waveform is an abnormal waveform.

Optionally, the charging apparatus further includes a power supply circuit. The power supply circuit is electrically connected to the controller and configured to supply power to the controller. In addition, the transformer further includes a second secondary coil and a second rectifier diode. A first end of the second secondary coil is electrically connected to an anode of the second rectifier diode, a cathode of the second rectifier diode is electrically connected to the power supply circuit, and a second electrode of the second secondary coil is grounded. Based on this, the second secondary coil and the primary coil are configured to buck the voltage of the primary coil through electromagnetic induction, and generate a second output voltage, where the second output voltage is used to supply power to the power supply circuit. In this case, the location at which the controller is electrically connected to the transformer is at the first end of the second secondary coil. A voltage waveform of the second output voltage is synchronous with the voltage waveform of the primary coil. Therefore, when the lower bridge switch is turned off, a waveform graph of the second output voltage may be collected to determine whether the sampling waveform is an abnormal waveform.

Optionally, that the sampling waveform in a current charging cycle is abnormal includes: The controller obtains a platform voltage Vt of the sampling waveform in a second phase of the $N^{th}$ charging cycle, and detects, in the second phase, that a peak voltage Vp of the sampling waveform is greater than the platform voltage Vt; or calculates, in the second phase, an integral area S, in the second phase, that is of a part of the sampling waveform and that exceeds the platform voltage Vt, where S>0. N≥1 and N is a positive integer. In this way, in a case of an abnormal waveform, the peak voltage Vp becomes larger than the platform voltage Vt. Therefore, Vp in a same cycle or an area of a part exceeding the platform voltage may be detected to determine whether the sampling waveform is an abnormal waveform.

Optionally, that the sampling waveform in a current charging cycle is abnormal includes: The controller obtains a platform voltage Vt of the sampling waveform in a second phase of the $N^{th}$ charging cycle, continuously obtains an integral area S that is in the second phase and that is of a part exceeding the platform voltage Vt in the second phase of the $N^{th}$ charging cycle and in a second phase of each of M charging cycles before the $N^{th}$ charging cycle, and calculates an area difference ΔS between integral areas S that are in two adjacent charging cycles and that are in the (M+1) integral areas S, where ΔS≠0. N≥1, and N is a positive number. M≥1, and M is a positive number. In a case of an abnormal waveform, the peak voltage Vp becomes larger than the platform voltage Vt. Therefore, areas of parts exceeding the platform voltage in different cycles may be detected to determine whether the sampling waveform is an abnormal waveform.

Optionally, that the sampling waveform in a current charging cycle is abnormal includes: The controller obtains a platform voltage Vt of the sampling waveform in a second phase of the $(N-1)^{th}$ charging cycle, and obtains a peak voltage Vp of the sampling waveform in a second phase of the $N^{th}$ charging cycle, where Vp>Vt. N≥2, and N is a positive integer. In a case of an abnormal waveform, the peak voltage Vp becomes larger than the platform voltage Vt. Therefore, Vt in a current cycle and Vp in a next cycle may be detected to determine whether the sampling waveform is an abnormal waveform.

Optionally, when the controller is electrically connected to the primary coil, the platform voltage is Vt=(Vo+Vo1× T1). Vo is the output voltage of the rectifier circuit, Vo1 is the output voltage provided by the transformer to the load, and T1 is a ratio of a quantity of turns of the primary coil in the transformer to a quantity of turns of the secondary coil configured to supply power to the load. Alternatively, when the controller is electrically connected to the secondary coil, the platform voltage is Vt=−Vo/T2. T2 is a ratio of a quantity of turns of the primary coil in the transformer to a quantity of turns of the secondary coil electrically connected to the controller. In this way, an abnormal waveform may be determined by using a value of the platform voltage.

Optionally, that the sampling waveform in a current charging cycle is abnormal includes: The controller continuously obtains a peak voltage Vp of the sampling waveform in a second phase of the $N^{th}$ charging cycle and in a second phase of each of M charging cycles before the $N^{th}$ charging cycle, and calculates a voltage difference ΔV between peak voltages Vp of the sampling waveform that are in two adjacent charging cycles and that are in the (M+1) peak voltages Vp, where ΔV≠0. N≥1, and N is a positive number.

M≥1, and M is a positive number. A peak voltage value of an abnormal waveform is different from a peak voltage value of a normal waveform. Therefore, peak voltages Vp in different cycles may be calculated to determine whether the sampling waveform is an abnormal waveform.

Optionally, that the sampling waveform in a current charging cycle is abnormal includes: The controller learns that a voltage of the sampling waveform is greater than or equal to 30 V at an end of a third phase of the $N^{th}$ charging cycle. N≥1 and N is a positive integer. In a case of a normal waveform, the voltage at the end of the third phase of the $N^{th}$ charging cycle, that is, a voltage at a start end of a first phase of the $(N+1)^{th}$ cycle, generates a negative current at a location of the primary coil because the upper bridge switch is turned on. Under action of the current, power in a parasitic capacitor in the lower bridge switch is removed, so that the voltage value rapidly drops to 0 or approaches 0. However, in a case of an abnormal waveform, the upper bridge switch is turned off, and the negative current does not exist, so that the voltage at the end of the third phase of the $N^{th}$ charging cycle is relatively high. Therefore, the voltage value at the end of the third phase of the $N^{th}$ charging cycle may be detected to determine whether the sampling waveform in the current charging cycle is an abnormal waveform.

Optionally, the charging apparatus further includes a sampling circuit, and the sampling circuit is electrically connected between the controller and the transformer. The sampling circuit is configured to buck a voltage at a location at which the sampling circuit is electrically connected to the transformer and then provide a bucked voltage to the controller. In this way, it may be ensured that a voltage value at the location at which the sampling circuit is electrically connected to the transformer does not exceed a voltage withstand value of the controller.

Optionally, the sampling circuit includes a first resistor and a second resistor, and a first end of the first resistor is electrically connected to the transformer. A first end of the second resistor is electrically connected to a second end of the first resistor and the controller, and a second end of the second resistor is grounded. A voltage value collected by the controller may be changed by adjusting a ratio of a resistance value of the first resistor to a resistance value of the second resistor, to ensure that the voltage value does not exceed a voltage withstand value of the controller. When the ratio of the resistance value of the first resistor to the resistance value of the second resistor is larger, the collected voltage value is smaller.

Optionally, the sampling circuit includes a first coil and a second coil. A first end of the first coil is electrically connected to the transformer, and a second end of the first coil is grounded. A first end of the second coil is electrically connected to the controller, and the other end of the second coil is grounded. In addition, a quantity of turns of the first coil is greater than a quantity of turns of the second coil. The voltage value collected by the controller may be changed by controlling a ratio of the quantity of turns of the first coil to the quantity of turns of the second coil. When the ratio of the quantity of turns of the first coil to the quantity of turns of the second coil is larger, the collected voltage value is smaller.

Optionally, the sampling circuit includes a third resistor and a second capacitor. A first end of the third resistor is electrically connected to the controller, and a second end of the third resistor is grounded. A first end of the second capacitor is electrically connected to the transformer, and a second end of the second capacitor is electrically connected to the controller. The voltage value collected by the controller may be changed by adjusting a capacitance value of the second capacitor or a resistance value of the third resistor. When the capacitance value of the second capacitor or the resistance value of the third resistor is larger, the collected voltage value is larger.

According to a second aspect of the embodiments of this application, a charging system is provided. The charging system includes an electronic device and any one of the foregoing charging apparatuses. The electronic device includes a battery, and the battery is electrically connected to the charging apparatus.

According to a third aspect of the embodiments of this application, a charging apparatus control method is provided, and the charging apparatus control method is applied to a charging apparatus. The charging apparatus includes a rectifier circuit, a transformer, a lower bridge switch, a clamp capacitor, an upper bridge switch, and a controller. The transformer includes a primary coil and at least one secondary coil, and a first end of the primary coil is electrically connected to the rectifier circuit. The controller is electrically connected to the transformer. In addition, a first end of the lower bridge switch is electrically connected to a second end of the primary coil, and a second end of the lower bridge switch is electrically connected to a grounding end. A first end of the clamp capacitor is electrically connected to the first end of the primary coil. A first end of the upper bridge switch is electrically connected to a second end of the clamp capacitor, and a second end of the upper bridge switch is electrically connected to the second end of the primary coil. The charging apparatus control method includes: In a first phase of a charging cycle of the charging apparatus, the controller controls the lower bridge switch to be turned on and the upper bridge switch to be turned off, so that a current output by the rectifier circuit charges the primary coil. In a second phase of the charging cycle, the controller controls the lower bridge switch to be turned off and the upper bridge switch to be turned on, so that the primary coil discharges electricity, the transformer bucks an output voltage of the rectifier circuit and provides a bucked output voltage to a load, and a leakage inductance in the primary coil charges the clamp capacitor. When the leakage inductance has no current to output, the clamp capacitor discharges electricity to the primary coil. The charging apparatus control method further includes a waveform processing step: In the second phase of the charging cycle, the controller obtains a sampling waveform at a location at which the controller is electrically connected to the transformer, where the sampling waveform includes a voltage waveform of the primary coil or a voltage waveform of the secondary coil. When the sampling waveform in a current charging cycle is abnormal, the controller turns off the lower bridge switch in a first phase of a next charging cycle. In this way, whether the upper bridge switch is abnormal may be found in time, and the lower bridge switch is turned off in the next cycle, to prevent the leakage inductance in the primary coil from charging the clamp capacitor, thereby avoiding problems such as a short circuit or an open circuit that occurs when a voltage of the clamp capacitor is excessively high.

Optionally, that the sampling waveform in a current charging cycle is abnormal includes: The controller obtains a platform voltage Vt of the sampling waveform in a second phase of the $N^{th}$ charging cycle, and detects, in the second phase, that a peak voltage Vp of the sampling waveform is greater than the platform voltage Vt; or calculates, in the second phase, an integral area S, in the second phase, that is of a part of the sampling waveform and that exceeds the platform voltage Vt, where S>0. N≥1 and N is a positive integer. In a case of an abnormal waveform, the peak voltage Vp becomes larger than the platform voltage Vt. Therefore, Vp in a same cycle or an area of a part exceeding the platform voltage may be detected to determine whether the sampling waveform is an abnormal waveform.

Optionally, that the sampling waveform in a current charging cycle is abnormal includes: The controller obtains a platform voltage Vt of the sampling waveform in a second phase of the $N^{th}$ charging cycle, continuously obtains an integral area S that is in the second phase and that is of a part exceeding the platform voltage Vt in the second phase of the $N^{th}$ charging cycle and in a second phase of each of M charging cycles before the $N^{th}$ charging cycle, and calculates an area difference ΔS between integral areas S that are in two adjacent charging cycles and that are in the (M+1) integral areas S, where ΔS≠0. N≥1, and N is a positive number. M≥1, and M is a positive number. In a case of an abnormal waveform, the peak voltage Vp becomes larger than the platform voltage Vt. Therefore, areas of parts exceeding the platform voltage in different cycles may be detected to determine whether the sampling waveform is an abnormal waveform.

Optionally, that the sampling waveform in a current charging cycle is abnormal includes: The controller obtains a platform voltage Vt of the sampling waveform in a second phase of the $(N-1)^{th}$ charging cycle, and obtains a peak voltage Vp of the sampling waveform in a second phase of the $N^{th}$ charging cycle, where Vp>Vt. N≥2, and N is a positive integer. In a case of an abnormal waveform, the peak voltage Vp becomes larger than the platform voltage Vt. Therefore, Vt in a current cycle and Vp in a next cycle may be detected to determine whether the sampling waveform is an abnormal waveform.

Optionally, when the controller is electrically connected to the primary coil, the platform voltage is Vt=(Vo+Vo1× T1). Vo is the output voltage of the rectifier circuit, Vo1 is the output voltage provided by the transformer to the load, and T1 is a ratio of a quantity of turns of the primary coil in the transformer to a quantity of turns of the secondary coil configured to supply power to the load. Alternatively, when the controller is electrically connected to the secondary coil, the platform voltage is Vt=−Vo/T2. T2 is a ratio of a quantity of turns of the primary coil in the transformer to a quantity of turns of the secondary coil electrically connected to the controller. In this way, an abnormal waveform may be determined by using a value of the platform voltage.

Optionally, that the sampling waveform in a current charging cycle is abnormal includes: The controller continuously obtains a peak voltage Vp of the sampling waveform in a second phase of the $N^{th}$ charging cycle and in a second phase of each of M charging cycles before the $N^{th}$ charging cycle, and calculates a voltage difference ΔV between peak voltages Vp of the sampling waveform that are in two adjacent charging cycles and that are in the (M+1) peak voltages Vp, where ΔV≠0. N≥1, and N is a positive number. M≥1, and M is a positive number. A peak voltage value of an abnormal waveform is different from a peak voltage value of a normal waveform. Therefore, peak voltages Vp in different cycles may be calculated to determine whether the sampling waveform is an abnormal waveform.

Optionally, that the sampling waveform in a current charging cycle is abnormal includes: The controller learns that a voltage of the sampling waveform is greater than or equal to 30 V at an end of a third phase of the $N^{th}$ charging cycle. N≥1 and N is a positive integer. In a case of a normal waveform, the voltage at the end of the third phase of the $N^{th}$ charging cycle, that is, a voltage at a start end of a first phase of the $(N+1)^{th}$ cycle, generates a negative current at a location of the primary coil because the upper bridge switch is turned on. Under action of the current, power in a parasitic capacitor in the lower bridge switch is removed, so that the voltage value rapidly drops to 0 or approaches 0. However, in a case of an abnormal waveform, the upper bridge switch is turned off, and the negative current does not exist, so that the voltage at the end of the third phase of the $N^{th}$ charging cycle is relatively high. Therefore, the voltage value at the end of the third phase of the $N^{th}$ charging cycle may be detected to determine whether the sampling waveform in the current charging cycle is an abnormal waveform.

REFERENCE NUMERALS

01—electronic device; 02—charging apparatus; 101—connector; 102—battery; 301—first power supply interface; 302—second power supply interface; 201—rectifier circuit; 202—transformer; 204—upper bridge drive circuit; 205—lower bridge drive circuit; FB—full-bridge rectifier circuit; Cst—capacitor; Cq—clamp capacitor; Lr—leakage inductance; Lm—primary coil; Ld—first secondary coil; Tc—upper bridge switch; Cj1—first parasitic capacitor; Cj2—second parasitic capacitor; g—gate; d—drain; s—source; D1—first rectifier diode; QVT—transistor; D—diode; L—live wire; N—neutral wire; 203—controller; 501—power supply circuit; 502—upper bridge power supply unit; 503—lower bridge power supply unit; D2—first rectifier diode; Lf—second secondary coil; 701—sampling circuit; Td—lower bridge switch; R1—first resistor; R2—second resistor; L1—first coil; L2—second coil; C2—second capacitor; and R3—third resistor.

DESCRIPTION OF EMBODIMENTS

The following describes technical solutions in embodiments of this application with reference to accompanying drawings in embodiments of this application. It is clear that the described embodiments are merely some but not all of embodiments of this application.

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more features. In the description of this application, unless otherwise stated, "a plurality of" means two or more than two.

In addition, in this application, orientation terms such as "left" and "right" may include but are not limited to orientations of components schematically placed in the accompanying drawings. It should be understood that these orientation terms are relative concepts and are used for relative description and clarification, and may correspondingly change based on a change of an orientation of a component placed in the accompanying drawings.

In this application, unless otherwise expressly specified and limited, the term "connect" should be understood in a broad sense. For example, a "connection" may be a fixed connection, a detachable connection, or an integrated connection; and may be a direct connection, or an indirect connection by an intermediate medium. In addition, the term "coupling" may be a manner of an electrical connection for implementing signal transmission. The "coupling" may be a direct electrical connection, or may be an indirect electrical connection by an intermediate medium.

Figure 1:
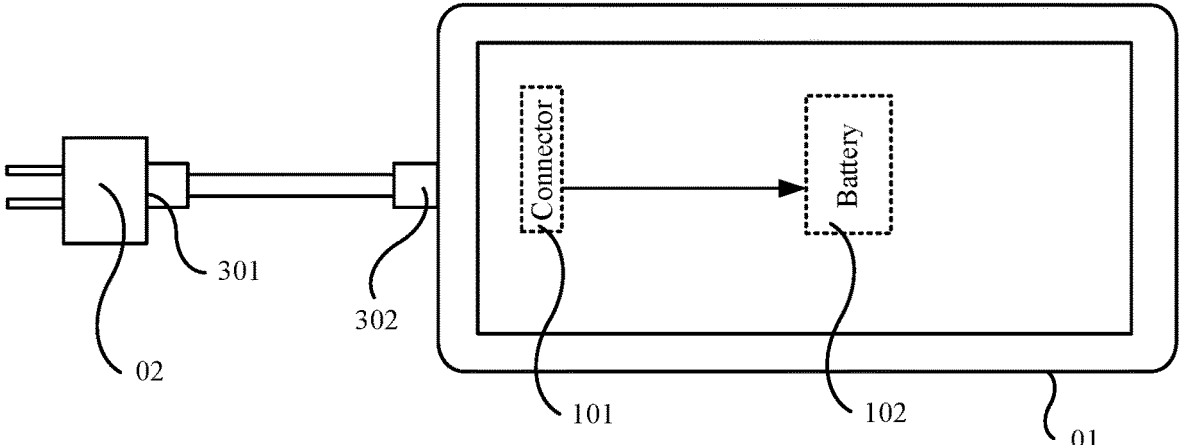
FIG. 1 is a schematic diagram of a structure of a charging system according to an embodiment of this application.

Embodiments of this application provide a charging system. As shown in FIG. 1, the charging system may include an electronic device 01 and a charging apparatus 02. The electronic device 01 may include a mobile phone, a tablet computer, a computer, a smart watch, a camera, and the like. This is not limited in this application. A battery 102 in the electronic device 01 is connected to a connector 101, a first power supply interface 301, and a second power supply interface 302, to be electrically connected to the charging apparatus 02. In addition, the charging apparatus 02 accesses a 220 V alternating current, converts the alternating current into a direct current that is suitable for working of the electronic device 01, so as to charge the battery 102 in the electronic device 01. The battery 102 supplies required power to a load circuit electrically connected to the battery 102 in the electronic device 01, so as to implement normal operation of the electronic device 01.

Figure 2A:
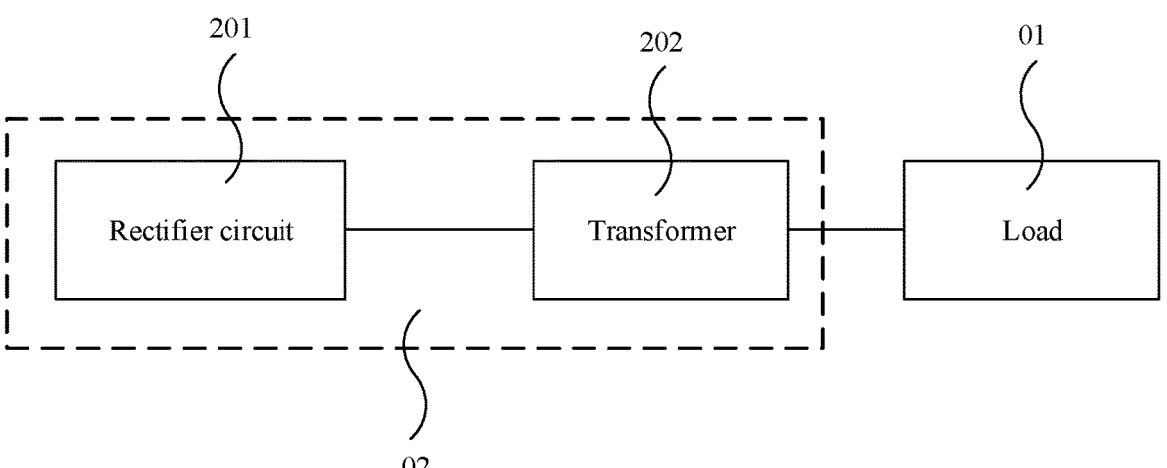
FIG. 2*a* is a schematic diagram of a structure of a charging apparatus according to an embodiment of this application.

A structure of the charging apparatus 02 in FIG. 1 is described below in detail. As shown in FIG. 2a, the charging apparatus 02 may include a rectifier circuit 201 and a transformer 202. The rectifier circuit 201 is electrically connected to the transformer 202, and a right side of the transformer 202 is electrically connected to a load 01. The rectifier circuit 201 is configured to rectify a received alternating current, and provide a voltage to the transformer 202. The transformer 202 is configured to convert the voltage into a working voltage applicable to the load 01, and transmit the voltage to the load 01. Therefore, the transformer 202 provides a voltage bucking function.

Figure 2B:
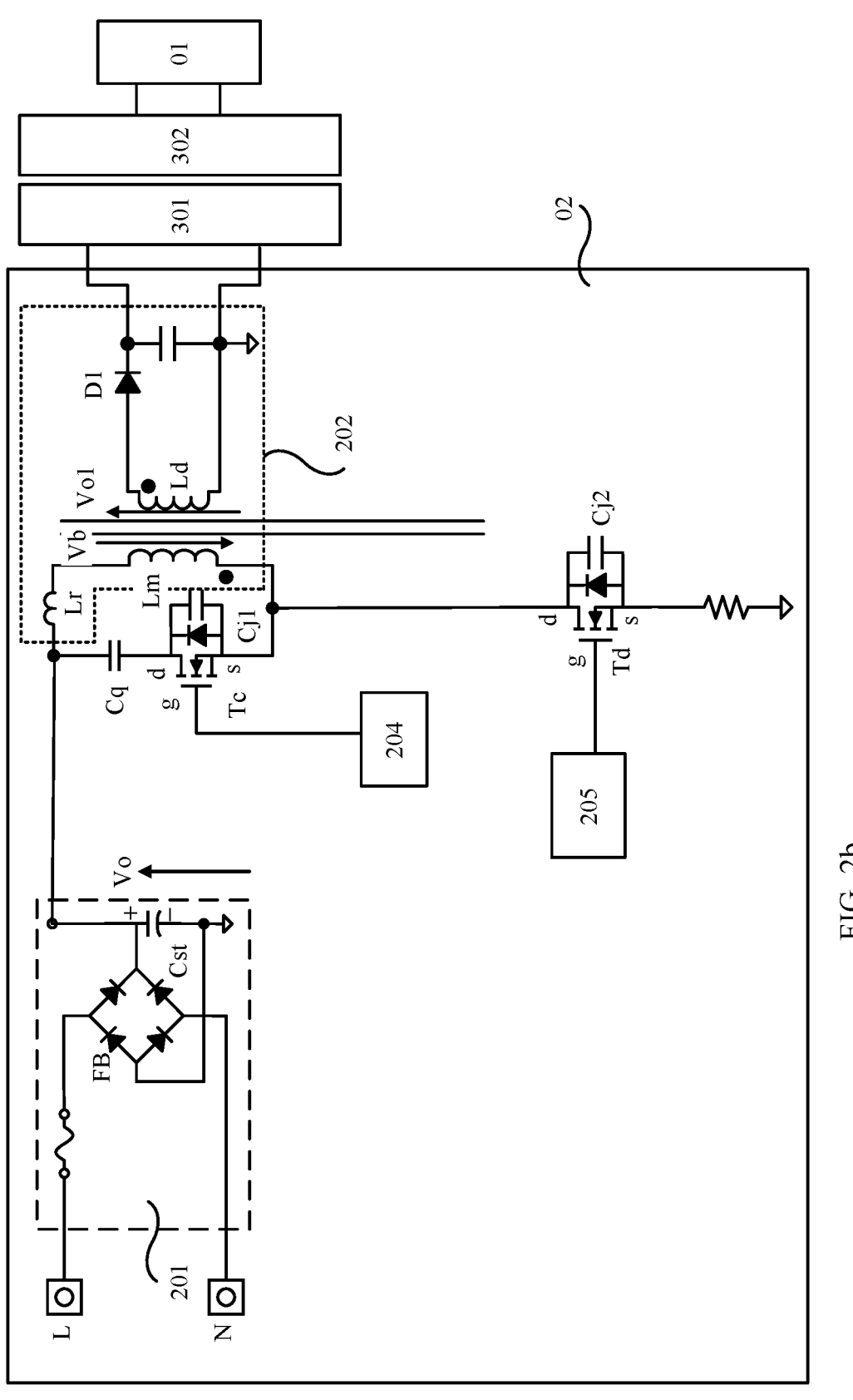
FIG. 2*b* is a schematic diagram of a structure of another charging apparatus according to an embodiment of this application.

As shown in FIG. 2b, the rectifier circuit 201 may be electrically connected to an external power supply network by using a live wire (L) and a neutral wire (N), so as to rectify an accessed alternating current. In addition, the rectifier circuit 201 may include a full-bridge rectifier circuit (FB) and a capacitor (Cst). The accessed 220 V alternating current flows through the full-bridge rectifier circuit (FB), and then the alternating current is converted into a direct current, and the direct current is stored in the capacitor (Cst). The capacitor (Cst) is configured to provide a voltage to the transformer 202 electrically connected to the capacitor (Cst). The voltage is referred to as an output voltage Vo of the rectifier circuit 201.

To enable the transformer 202 to provide the voltage bucking function, the transformer 202 may include a primary coil Lm and at least one secondary coil. The transformer 202 may include a first secondary coil (Ld). In this case, a first end (an upper end) of the primary coil Lm is electrically connected to the rectifier circuit 201, and a first end (an upper end) of the first secondary coil (Ld) is electrically connected to the first power supply interface 301, and is electrically connected to the load 01 by using the second power supply interface 302. Based on this, the first secondary coil (Ld) and the primary coil Lm are configured to buck a voltage Vb of the primary coil Lm through electromagnetic induction, and generate a first output voltage Vo1, that is, a voltage of the first secondary coil (Ld). The voltage Vb of the primary coil Lm and the voltage Vo1 of the first secondary coil (Ld) are proportional to a quantity of turns corresponding to the primary coil Lm and a quantity of turns corresponding to the first secondary coil (Ld). Therefore, the voltage of the first secondary coil (Ld) may be adjusted by controlling the quantity of turns of the primary coil Lm and the quantity of turns of the first secondary coil (Ld). In addition, to enable the transformer 202 to provide the voltage bucking function, the quantity of turns of the primary coil Lm should be greater than the quantity of turns of the first secondary coil (Ld).

In addition, the transformer 202 may further include a first rectifier diode D1. The first rectifier diode D1 is configured to rectify a current transmitted to the load 01. The first end (the upper end) of the first secondary coil (Ld) is electrically connected to an anode of the first rectifier diode D1, a cathode of the first rectifier diode D1 is configured to be electrically connected to the load 01, and a second end (a lower end) of the first secondary coil (Ld) is grounded.

It should be noted that a voltage value of a voltage that is transformed by the transformer 202 changes by a same proportion only due to different quantities of turns of the coil, and a change trend of the voltage does not change. Therefore, theoretically, a waveform of the voltage Vb of the primary coil Lm is synchronous with a waveform of the voltage Vo1 of the first secondary coil (Ld), and a phase difference is 180°. Waveform synchronization means that waveforms change simultaneously with time. For example, at a same moment, when the voltage waveform of the primary coil Lm increases in a direction of a forward voltage, the voltage Vo1 of the first secondary coil (Ld) increases in a direction of a negative voltage.

Based on this, the charging apparatus 02 may further include a clamp capacitor Cq, an upper bridge switch Tc, and a lower bridge switch Td. The first end (the upper end) of the primary coil Lm is electrically connected to a first end (an upper end) of the clamp capacitor Cq, a second end (a lower end) of the primary coil Lm is electrically connected to a second end (a lower end) of the upper bridge switch Tc, and a first end (an upper end) of the upper bridge switch Tc is electrically connected to a second end (a lower end) of the clamp capacitor Cq. In addition, a first end (an upper end) of the lower bridge switch Td is electrically connected to the second end (the lower end) of the primary coil Lm, and a second end (a lower end) of the lower bridge switch Td is electrically connected to the ground.

Figure 2C:
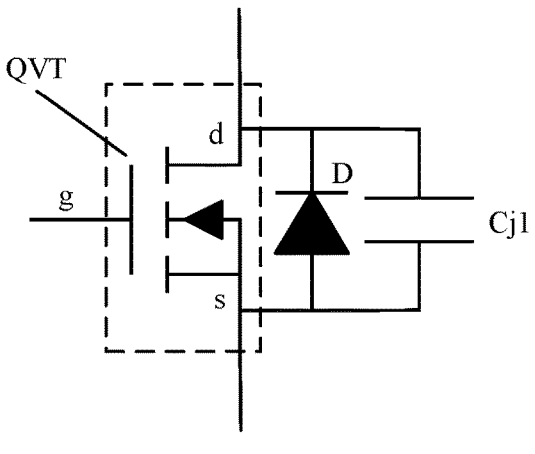
FIG. 2*c* is a schematic diagram of a structure of an upper bridge switch in FIG. 2*b;*

It should be noted that the upper bridge switch Tc includes, as shown in FIG. 2c, a transistor (QVT) and a diode D electrically connected to a source (s) and a drain (d) of the transistor (QVT). The transistor (QVT) may be a P-type transistor, or may be an N-type transistor (the N-type transistor is shown in the figure, where an upper end of the N-type transistor corresponds to the drain d, and a lower end of the N-type transistor corresponds to the source s.) In this case, the upper bridge switch Tc has a single turn-off function. To be specific, when a signal received by a gate (g) of the upper bridge switch Tc is used to control the transistor (QVT) to be cut off, the diode D is cut off and the entire lower bridge switch is turned off only when a voltage of a cathode of the diode D is greater than a voltage of an anode of the diode D. The transistor (QVT) may be a field effect transistor (FET). In addition, when the upper bridge switch Tc is turned off, a first parasitic capacitor Cj1 shown in FIG. 2c further exists.

A structure of the lower bridge switch Td is the same as a structure of the upper bridge switch Tc, and details are not described herein again.

To drive the upper bridge switch Tc and the lower bridge switch Td to be turned on, the charging apparatus 02 may further include an upper bridge drive circuit 204 and a lower bridge drive circuit 205. When the upper bridge drive circuit 204 or the lower bridge drive circuit 205 provides a corresponding voltage to a gate (g) of the upper bridge switch Tc or the lower bridge switch Td, the upper bridge switch Tc or the lower bridge switch Td may be turned on under action of the voltage.

Based on this, in a process of charging the transformer 202, the charging apparatus 02 may go through N charging cycles, where N≥1, and N is a positive number. Any charging cycle in the N charging cycles may include, as shown in FIG. 3b, a first phase P1, a second phase P2, and a third phase P3. The following describes a working process of the charging apparatus 02 in any charging cycle T in the N charging cycles.

Figure 3A:
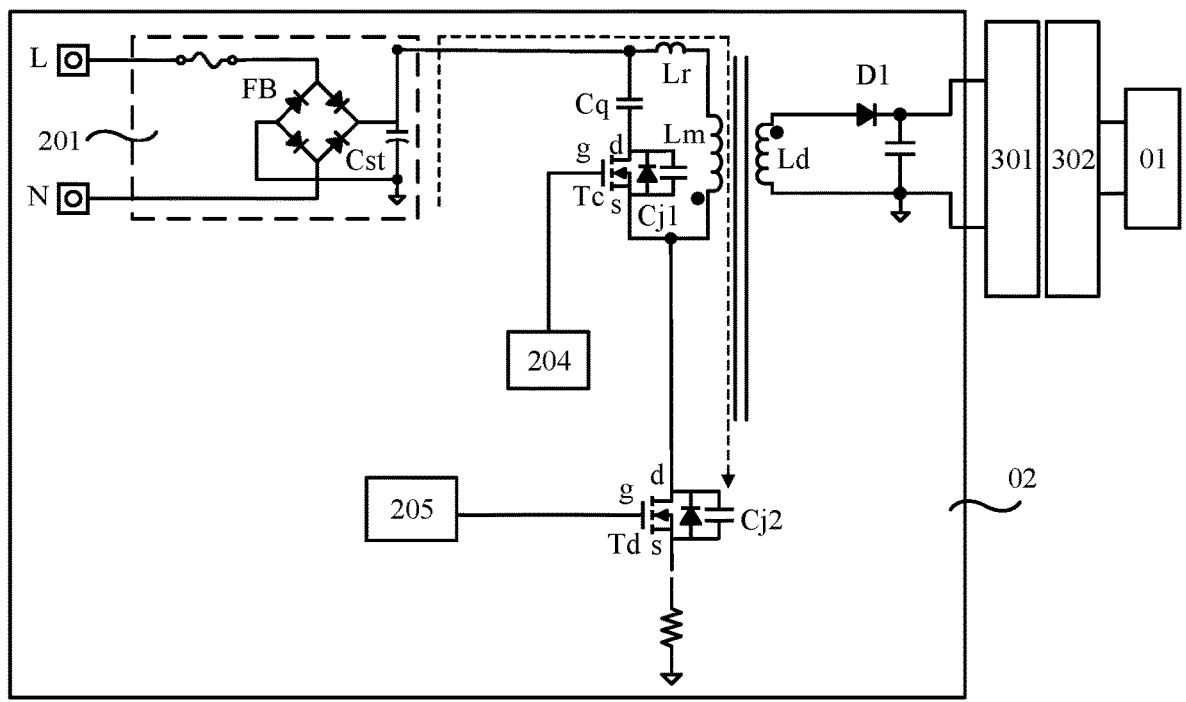
FIG. 3*a* is a schematic diagram of a structure of another charging apparatus according to an embodiment of this application.
Figure 3B:
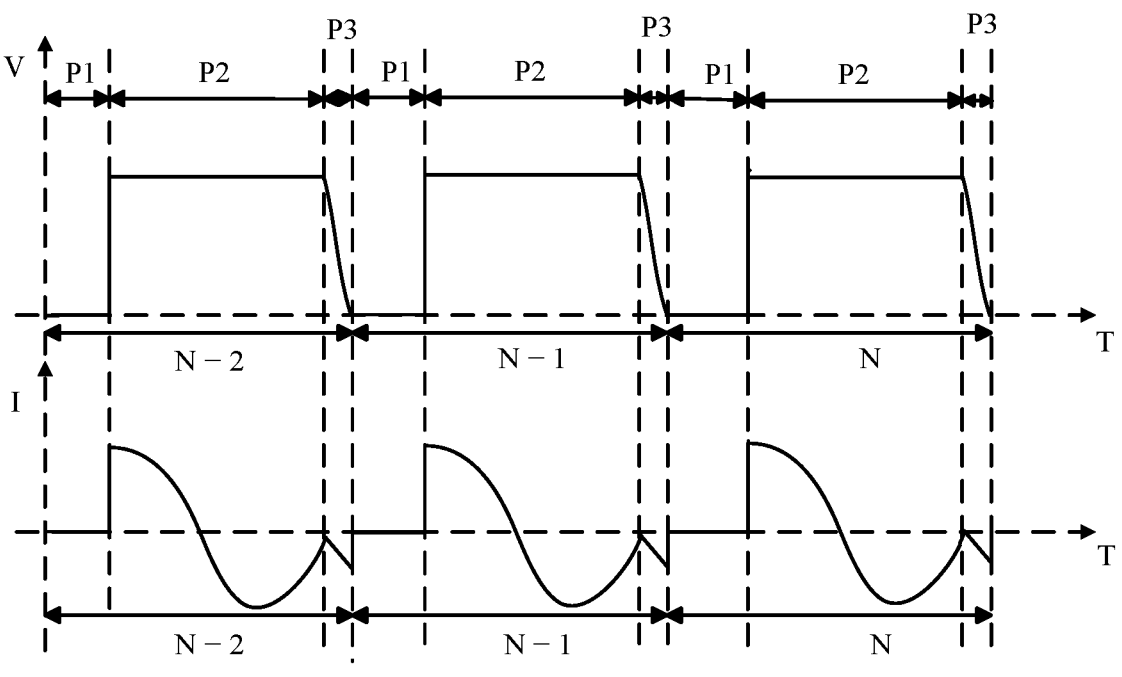
FIG. 3*b* shows a waveform graph (an upper half part) for a voltage Vds corresponding to a lower bridge switch and a cycle T, and a waveform graph (a lower half part) for a current of a clamp capacitor Cq and a cycle according to an embodiment of this application.

In the first phase P1 of the charging cycle T, as shown in FIG. 3a, the lower bridge switch Td is turned on, and the upper bridge switch Tc is turned off. In this case, the output voltage Vo of the rectifier circuit 201 is transmitted to the primary coil Lm, to charge the primary coil Lm. FIG. 3b shows, when the lower bridge switch Td is turned off, a waveform graph (an upper half part of FIG. 3b) corresponding to a source-drain voltage (that is, a voltage Vds) corresponding to the lower bridge switch Td and a cycle T, and a waveform graph (a lower half part of FIG. 3b) corresponding to a current of the clamp capacitor Cq and a cycle, where the waveform graph of Vds and the waveform graph of the current of clamp capacitor Cq are in an up-down correspondence.

In the first phase P1, because the lower bridge switch Td is turned on, the voltage Vds is not in the waveform graph corresponding to the voltage Vds and the cycle, and is represented by 0 herein. Similarly, the current of the clamp capacitor Cq is also represented by 0 in the waveform graph corresponding to the current of the clamp capacitor Cq and the cycle.

Figure 3C:
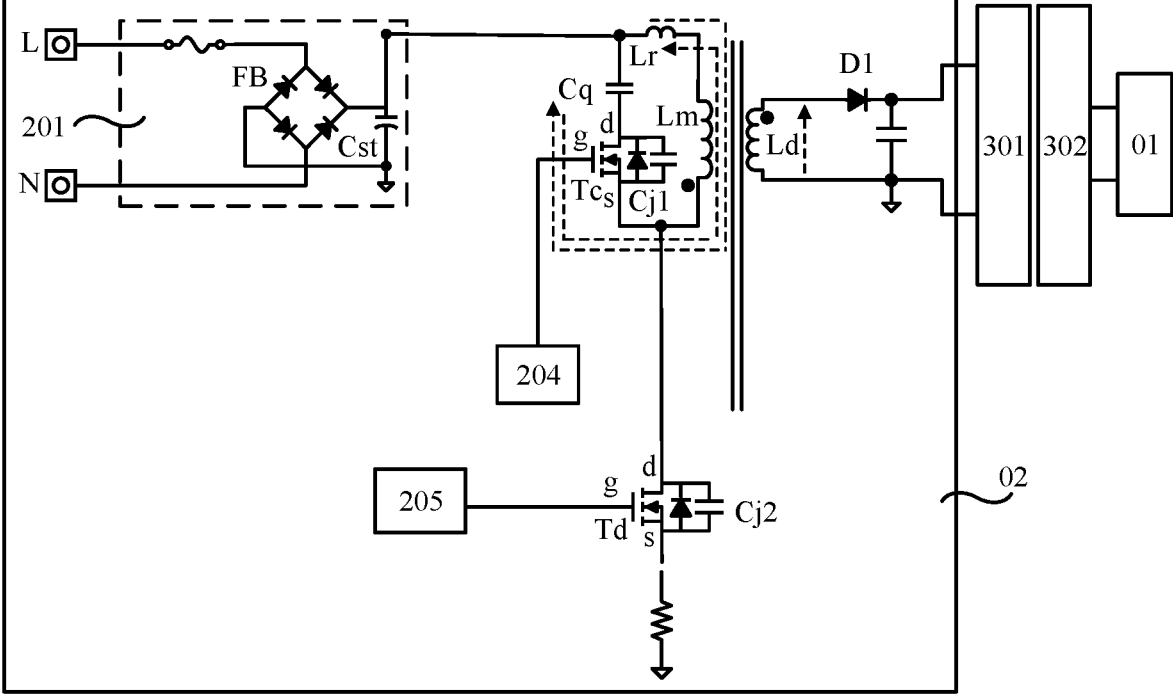
FIG. 3*c* is a schematic diagram of a structure of another charging apparatus according to an embodiment of this application.

In the second phase P2 of the charging cycle T, as shown in FIG. 3c, the lower bridge switch Td is turned off, and the upper bridge switch Tc is turned on. In this case, first, the primary coil Lm discharges electricity to the first secondary coil (Ld) through electromagnetic induction. In the discharging process, a part of magnetic flux fails to be coupled to the first secondary coil (Ld) by using a magnetic core, and returns to the primary coil Lm through air closing, so that a leakage inductance Lr shown in FIG. 3c is generated in the primary coil Lm. Based on this, when the primary coil Lm discharges electricity to the first secondary coil (Ld), the leakage inductance Lr in the primary coil Lm charges the clamp capacitor Cq to generate a forward current shown in FIG. 3b. Then, when the leakage inductance Lr has no current to output, the clamp capacitor Cq discharges electricity to the primary coil Lm to generate a negative current shown in FIG. 3b.

In the waveform graph corresponding to the voltage value of Vds and the cycle, because the primary coil Lm discharges electricity to the first secondary coil (Ld) in this phase, the voltage value of the Vds remains unchanged. In addition, the leakage inductance Lr in the primary coil Lm charges and discharges electricity to the clamp capacitor Cq, and a voltage value corresponding to the leakage inductance Lr may be ignored because a capacity of the clamp capacitor Cq is relatively large. Therefore, the voltage value of Vds may always remain unchanged in the second phase P2.

Figure 3D:
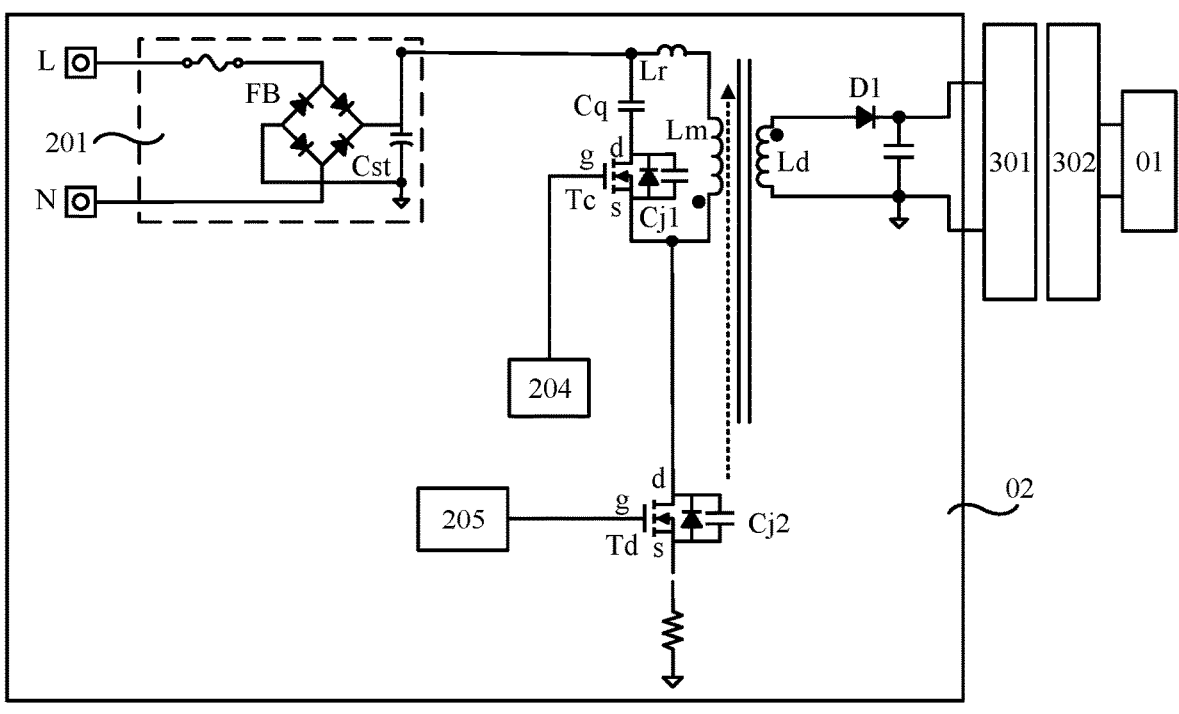
FIG. 3*d* is a schematic diagram of a structure of another charging apparatus according to an embodiment of this application.

In the third phase P3 of the charging cycle T, as shown in FIG. 3d, the lower bridge switch Td is turned off, and the upper bridge switch Tc is turned off, that is, this is dead time. In the second phase P2 of the charging cycle T, a bottom-up current exists at a location of the primary coil Lm. Therefore, when the upper bridge switch Tc is turned off, under action of the current, power in a parasitic capacitor Cj2 in the lower bridge switch Td may be removed to generate a negative current. Therefore, in the third phase P3, there is a low negative current in the waveform graph corresponding to the current of the clamp capacitor Cq and the cycle. In addition, the power in the second parasitic capacitor Cj2 in the lower bridge switch Td is removed. Therefore, in this case, the voltage value of Vds rapidly drops to 0 or approaches 0.

The foregoing describes a charging process of the charging apparatus 02 by using one charging cycle. When charging the transformer 202, the charging apparatus 02 may include a plurality of charging cycles. A charging process in each charging cycle is the same as the foregoing, and details are not described herein again.

Figure 4A:
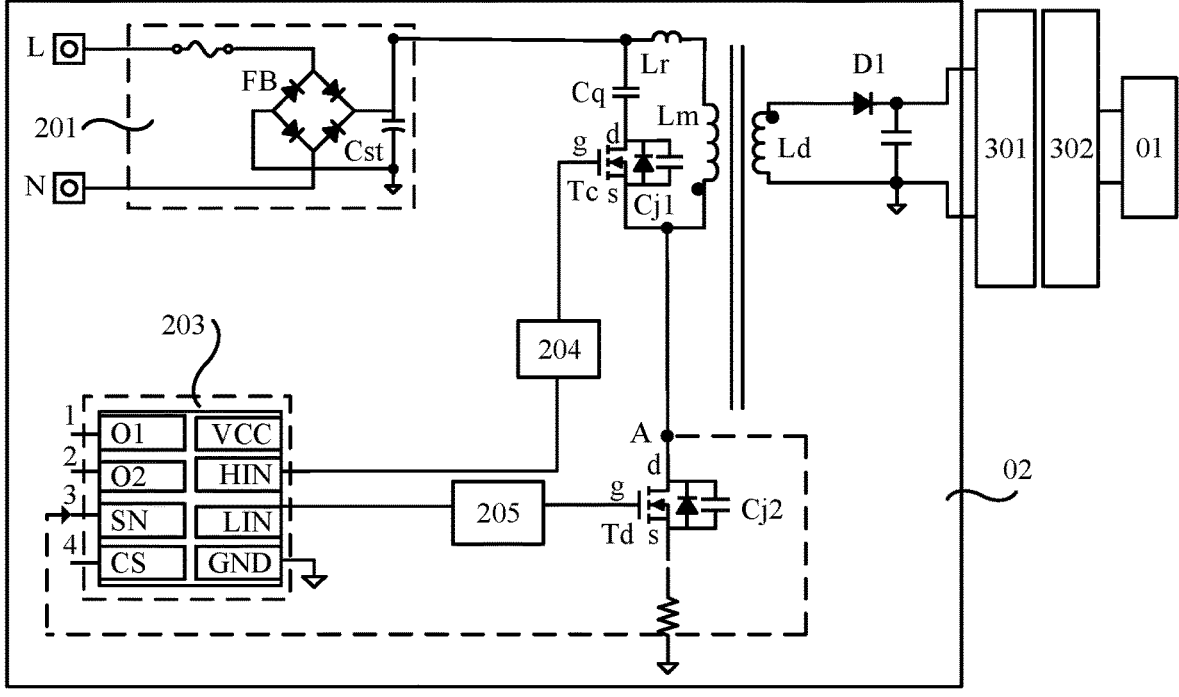
FIG. 4*a* is a schematic diagram of a structure of another charging apparatus according to an embodiment of this application.

In addition, as shown in FIG. 4a, the charging apparatus 02 provided in this embodiment of this application further includes a controller 203. In some embodiments of this application, the controller 203 may be electrically connected to a strobe end of the lower bridge switch Td and a strobe end of the upper bridge switch Tc by using the lower bridge drive circuit 205 and the upper bridge drive circuit 204. The strobe end is configured to control a switch to be turned on or turned off. When the switch is a transistor, the strobe end is a gate g of the transistor. The controller 203 outputs a logic signal in the first phase P1 and the second phase P2 of the charging cycle through an HIN port and LIN port to drive the upper bridge drive circuit 204 and the lower bridge drive circuit 205, so as to control the upper bridge switch Tc and the lower bridge switch Td to be alternatively turned on.

Based on this, for ease of description, in the charging apparatus 02, a location at which the controller 203 is electrically connected to the transformer 202 may be referred to as a sampling point. The controller 203 may obtain, at the location of the sampling point, a voltage waveform at the location at which the controller 203 is electrically connected to the transformer 202, and use the voltage waveform as a sampling waveform. For example, as shown in FIG. 4a, a sampling point A may be located between the second end (the lower end) of the primary coil Lm and the first end (the upper end) of the lower bridge switch Td, or between the second end (the lower end) of the upper bridge switch Tc and the first end (the upper end) of the lower bridge switch Td. It should be noted that FIG. 4a only shows an example location.

It may be learned from the foregoing that, if in the second phase P2 of the charging cycle, the upper bridge switch Tc should be turned on but is not turned on, the leakage inductance Lr in the primary coil Lm can charge only the clamp capacitor Cq, and the clamp capacitor Cq cannot discharge electricity to the primary coil Lm by using the upper bridge switch Tc, which causes problems such as a short circuit or an open circuit that occurs when a voltage of the clamp capacitor Cq is excessively high.

Based on this, the controller 203 obtains the sampling waveform at the sampling point A through an SN port. In the second phase P2 of the charging cycle, when the lower bridge switch Td is turned off, a voltage of the sampling waveform at the sampling point A is equal to the sum of the output voltage Vo of the rectifier circuit 201 and the voltage Vb of the primary coil Lm. The output voltage Vo of the rectifier circuit 201 is a direct-current voltage, and therefore generates no impact on a change trend of the voltage waveform of the primary coil Lm. In this case, a sampling waveform obtained by the controller 203 at the sampling point A may include the voltage waveform of the primary coil Lm, so that the sampling waveform at the sampling point A and the voltage waveform of the primary coil Lm can change simultaneously with time.

In this way, when the sampling waveform in a current charging cycle is abnormal, the controller 203 turns off the lower bridge switch Td in the first phase P1 of a next charging cycle, to prevent the leakage inductance Lr in the primary coil Lm from charging the clamp capacitor Cq, thereby avoiding problems such as a short circuit or an open circuit that occurs when a voltage of the clamp capacitor Cq is excessively high.

It should be noted that the next charging cycle refers to a charging cycle (for example, the $(N+1)^{th}$ charging cycle) that is adjacent to a current charging cycle (for example, the $N^{th}$ charging cycle) in which it is determined whether the sampling waveform is abnormal and that appears after the $N^{th}$ charging cycle in a time sequence that is, a next charging cycle of the $N^{th}$ charging cycle.

In addition, if the upper bridge switch Tc is not turned on, the parasitic capacitor Cj1 included in the upper bridge switch Tc is connected in series to the clamp capacitor Cq. In this case, a capacitance value of an equivalent capacitor is less than a capacitance value of any of the first parasitic capacitor Cj1 and the clamp capacitor Cq, and greatly decreases compared with a capacitance value (that is, the capacitance value of the clamp capacitor Cq) when the upper bridge switch Tc is turned on. Therefore, when the upper bridge switch Tc is not turned on, the leakage inductance Lr may quickly perform charging and discharging, thereby generating relatively high electromotive force. In this way, a waveform of the sum of the output voltage Vo of the rectifier circuit 201 and the voltage Vb of the primary coil Lm is changed. Therefore, the waveform of the sum of the output voltage Vo of the rectifier circuit 201 and the voltage Vb of the primary coil Lm may be detected to determine whether the voltage of the clamp capacitor Cq is excessively high.

Figure 4B:
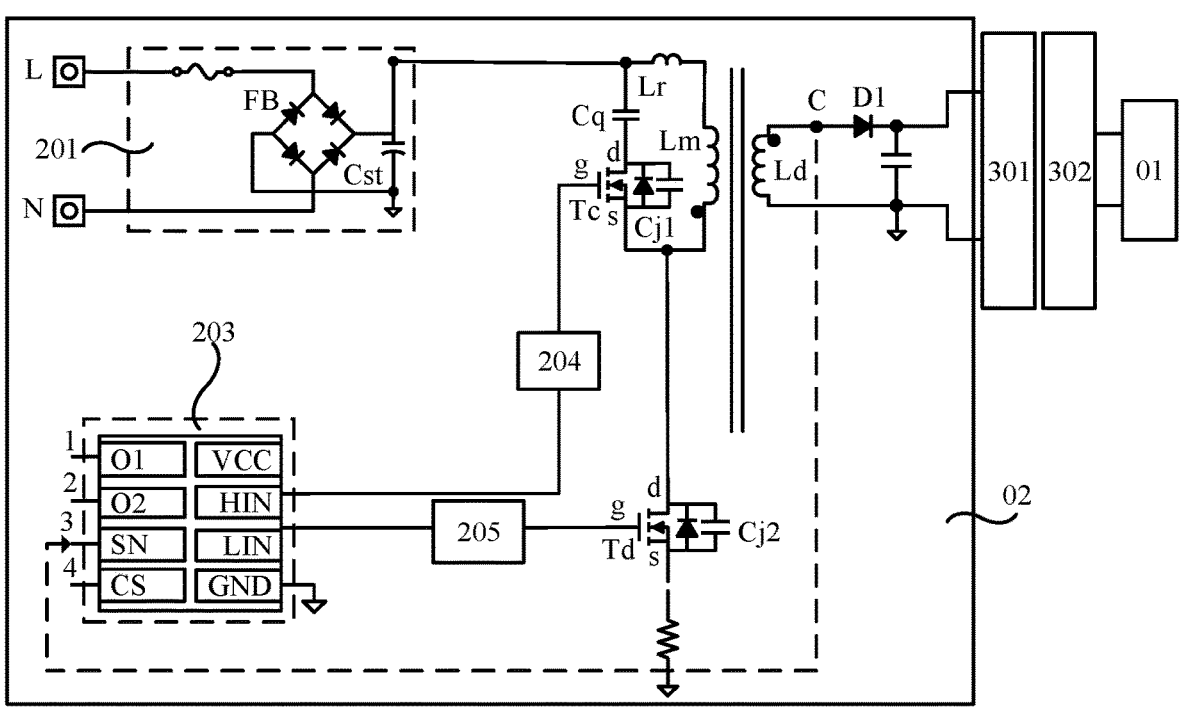
FIG. 4*b* is a schematic diagram of a structure of another charging apparatus according to an embodiment of this application.

The foregoing is described by using an example in which the sampling point is disposed between the second end (the lower end) of the primary coil Lm and the first end (the upper end) of the lower bridge switch Td. In some other embodiments of this application, the waveform of the voltage Vb of the primary coil Lm is synchronous with the waveform of the voltage Vo1 of the first secondary coil (Ld), and a value of the output voltage Vo of the rectifier circuit 201 remains unchanged, so that as shown in FIG. 4b, the sampling point may be disposed on a side of an output voltage of the transformer 202, that is, the first end C (referred to as a sampling point C below) of the first secondary coil (Ld). In this case, a sampling waveform obtained by the controller 203 at the sampling point C may include a voltage waveform of the first secondary coil (Ld), so that the sampling waveform at the sampling point C and the voltage waveform of the first secondary coil (Ld) can change simultaneously with time.

It may be learned from the foregoing that the controller 203 can control on/off of the upper bridge switch Tc and the lower bridge switch Td. To supply power to the controller 203, the charging apparatus 02 provided in this embodiment of this application may further include a power supply circuit 501 shown in FIG. 5. The power supply circuit 501 is electrically connected to the controller 203 through a VCC port. In addition, a GND port is disposed in the controller 203, and a voltage difference is formed between the VCC port and the GND port, so as to provide a voltage to the controller 203.

Based on this, to supply power to the power supply circuit 501, the transformer 202 may further include a second secondary coil Lf and a second rectifier diode D2. A first end (an upper end) of the second secondary coil Lf is electrically connected to an anode of the second rectifier diode D2, and a cathode of the second rectifier diode D2 is electrically connected to the power supply circuit 501. In addition, a second electrode of the second secondary coil Lf is grounded.

In this case, the second secondary coil Lf and the primary coil Lm are configured to buck the voltage Vb of the primary coil Lm through electromagnetic induction, and generate a second output voltage Vo2. The second output voltage Vo2 is used to supply power to the power supply circuit 501. After converting the voltage into a working voltage of the controller 203, the power supply circuit 501 transmits the voltage to the VCC port in the controller 203.

To supply power to the upper bridge drive circuit 204 and the lower bridge drive circuit 205, the charging apparatus 02 further includes an upper bridge power supply unit 502 and a lower bridge power supply unit 503. The upper bridge power supply unit 502 is separately electrically connected to the power supply circuit 501 and the upper bridge drive circuit 204, and the lower bridge power supply unit 503 is separately electrically connected to the power supply circuit 501 and the lower bridge drive circuit 205. In this case, the upper bridge power supply unit 502 and the lower bridge power supply unit 503 are respectively converted into working voltages of the upper bridge drive circuit 204 and the lower bridge drive circuit 205 by using the power supply circuit 501, and then the working voltages are transmitted to the upper bridge power supply unit 502 and the lower bridge power supply unit 503.

In addition, the controller 203 further includes a CS port, an O1 port, and an O2 port. The CS port is configured to monitor a current in a circuit when the lower bridge switch Td is turned on, so as to prevent an anomaly. The O1 port and the O2 port have other functions, which may be specifically set based on a situation.

Figure 5:
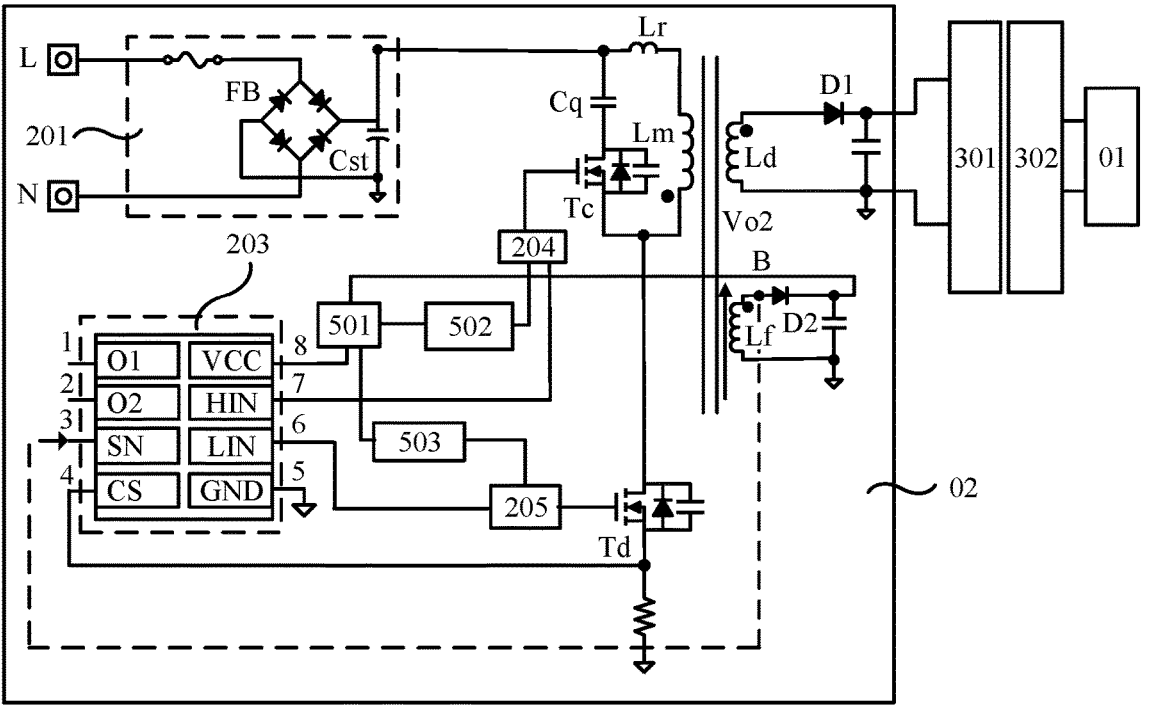
FIG. 5 is a schematic diagram of a structure of another charging apparatus according to an embodiment of this application.

Based on this, in some other embodiments of this application, the sampling point may be located at the first end B (referred to as a sampling point B below) of the second secondary coil Lf shown in FIG. 5. The second output voltage Vo2 of the second secondary coil Lf is simply obtained through electromagnetic induction of the primary coil Lm in the transformer 202, so that similarly, in same time, the voltage Vb of the primary coil Lm and the voltage Vo2 of the second secondary coil Lf are different only due to different quantities of turns of the coil. Therefore, the waveform of the voltage Vb of the primary coil Lm is synchronous with a waveform of the voltage Vo2 of the second secondary coil Lf, and a phase difference is 180°. Therefore, when the lower bridge switch Td is turned off, whether the upper bridge switch Tc is abnormal may be determined by using the waveform of the second output voltage Vo2. In this case, a sampling waveform obtained by the controller 203 at the sampling point B may include the voltage waveform of the second secondary coil Lf, so that the sampling waveform at the sampling point B and the voltage waveform of the second secondary coil Lf can change simultaneously with time.

How the controller 203 determines, after obtaining a sampling waveform, that the waveform is abnormal is described below by using an example in which the sampling point is disposed between the second end (the lower end) of the primary coil Lm and the first end (the upper end) of the lower bridge switch Td.

Example 1

In this example, that the sampling waveform in a current charging cycle is abnormal includes: In the second phase P2 of the $N^{th}$ charging cycle, the controller 203 obtains a peak voltage Vp of the sampling waveform, where the peak voltage Vp is greater than a voltage threshold Vth. In this case, the current charging cycle in this embodiment of this application is the $N^{th}$ charging cycle.

Figure 6A:
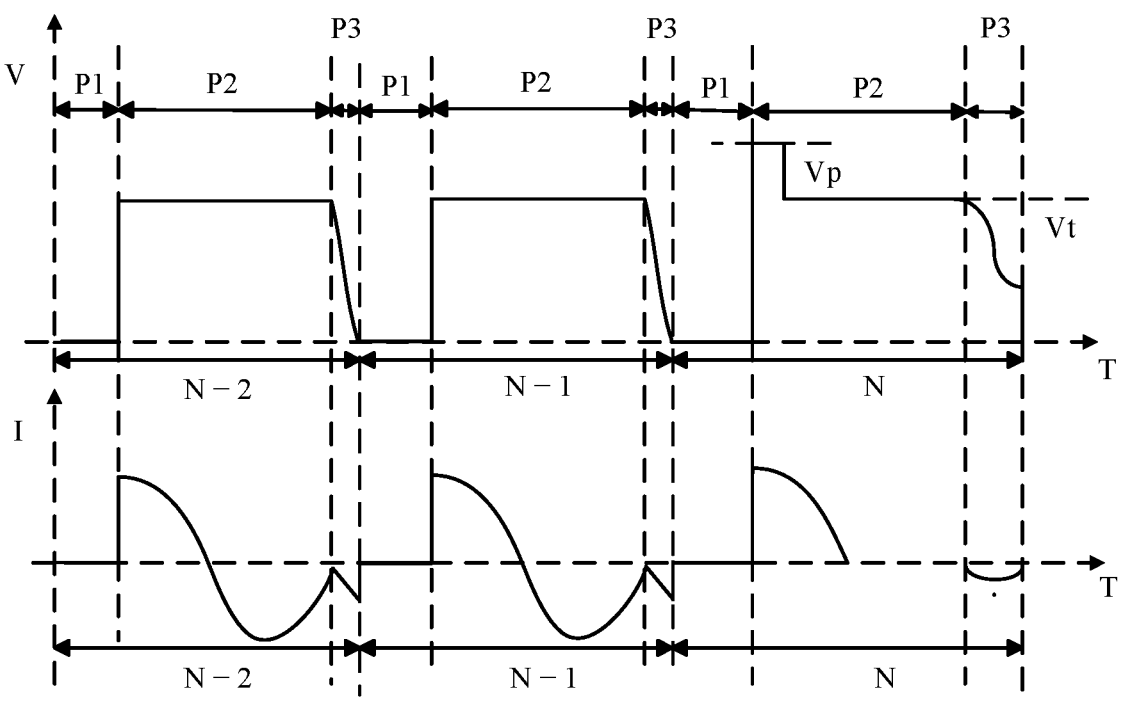
FIG. 6*a* shows another waveform graph (an upper half part) for a voltage Vds corresponding to a lower bridge switch and a cycle T, and another waveform graph (a lower half part) for a current of a clamp capacitor Cq and a cycle according to an embodiment of this application.

As shown in FIG. 6a, an abnormal waveform refers to a corresponding waveform that has a shape different from that in FIG. 3b in the second phase P2. (When the lower bridge switch Td is turned off, a voltage corresponding to a source s end of the lower bridge switch Td is 0, so that a voltage corresponding to a drain d end of the lower bridge switch Td is the voltage Vds of the lower bridge switch. Therefore, when the lower bridge switch Td is turned off, a waveform graph for a voltage corresponding to the sampling point A and the cycle and a waveform graph for a current of the clamp capacitor Cq and the cycle are, as shown in FIG. 3b, the waveform graph for the voltage Vds corresponding to the lower bridge switch Td and the cycle T and the waveform graph for the current of the clamp capacitor Cq and the cycle.) In FIG. 6a, waveforms in the $(N-1)^{th}$ cycle and the $(N-2)^{th}$ cycle are normal waveforms, and a waveform in the $N^{th}$ cycle is an abnormal waveform.

It should be noted that, for ease of description herein, N is an integer greater than or equal to 3. In addition, similar to that in a case of a normal waveform, in a case of an abnormal waveform, in the second phase P2, the primary coil Lm discharges electricity to the first secondary coil (Ld), and the voltage value of the first secondary coil (Ld) remains unchanged. However, when the leakage inductance Lr in the primary coil Lm charges and discharges electricity to the clamp capacitor Cq, the first parasitic capacitor Cj1 is generated because the upper bridge switch Tc is not turned on. After the first parasitic capacitor Cj1 and the clamp capacitor Cq are connected in series, it is equivalent to obtaining a capacitor smaller than any of the first parasitic capacitor Cj1 and the clamp capacitor Cq, and the leakage inductance Lr may quickly perform charging and discharging, thereby generating relatively high electromotive force. Therefore, in FIG. 6a, a voltage value of the abnormal waveform in the second phase P2 increases. However, when the leakage inductance Lr gradually decreases and ultimately becomes 0 due to a damping effect, the voltage is restored to a voltage the same as the normal waveform.

In the waveform corresponding to the current of the clamp capacitor and the cycle, the leakage inductance Lr in the primary coil Lm charges only the clamp capacitor Cq to generate a forward current. Because the upper bridge switch Tc is not turned on and the leakage inductance Lr cannot discharge electricity, a negative current cannot be generated. As a result, the voltage of the clamp capacitor Cq is excessively high, and problems such as a short circuit or an open circuit may occur.

In some embodiments of this application, as shown in FIG. 6a, the voltage threshold Vth may be a platform voltage Vt. In this case, because at the location at which the controller 203 is electrically connected to the transformer 200, that is, the sampling point is the sampling point A, the controller 203 may be electrically connected to the primary coil Lm by using the sampling point A, the platform voltage is $Vt=Vo+Vo1 \times T1$.

Vo is the output voltage of the rectifier circuit 201, Vo1 is the output voltage provided by the transformer 202 to the load 01, that is, the voltage of the first secondary coil (Ld), and T1 is a ratio of a quantity of turns of the primary coil in the transformer to a quantity of turns of the secondary coil configured to supply power to the load (that is, a ratio of the quantity of turns of the primary coil Lm to a quantity of turns of the first secondary coil (Ld))

It should be noted that when the controller 203 is electrically connected to the secondary coil by using the sampling point, the platform voltage is $Vt=-Vo/T2$, where T2 is a ratio of the quantity of turns of the primary coil Lm in the transformer to a quantity of turns of the secondary coil electrically connected to the controller 203 by using the sampling point. For example, when the sampling point is the sampling point B shown in FIG. 5, T2 is a ratio of the quantity of turns of the primary coil Lm to a quantity of turns of the second secondary coil Lf; and when the sampling point is the sampling point C shown in FIG. 4b, T2 is a ratio of the quantity of turns of the primary coil Lm to the quantity of turns of the first secondary coil (Ld).

It should be noted that, affected by factors such as calculation precision of the controller 203, the voltage threshold Vth may be a value near the platform voltage Vt, for example, the platform voltage ±20 V. This is not limited in this application.

In this case, the controller 203 may include a comparator. The comparator outputs a logic signal after comparing the peak voltage Vp with the voltage threshold Vth, to drive the lower bridge drive circuit 205 to perform an action.

Figure 6B:
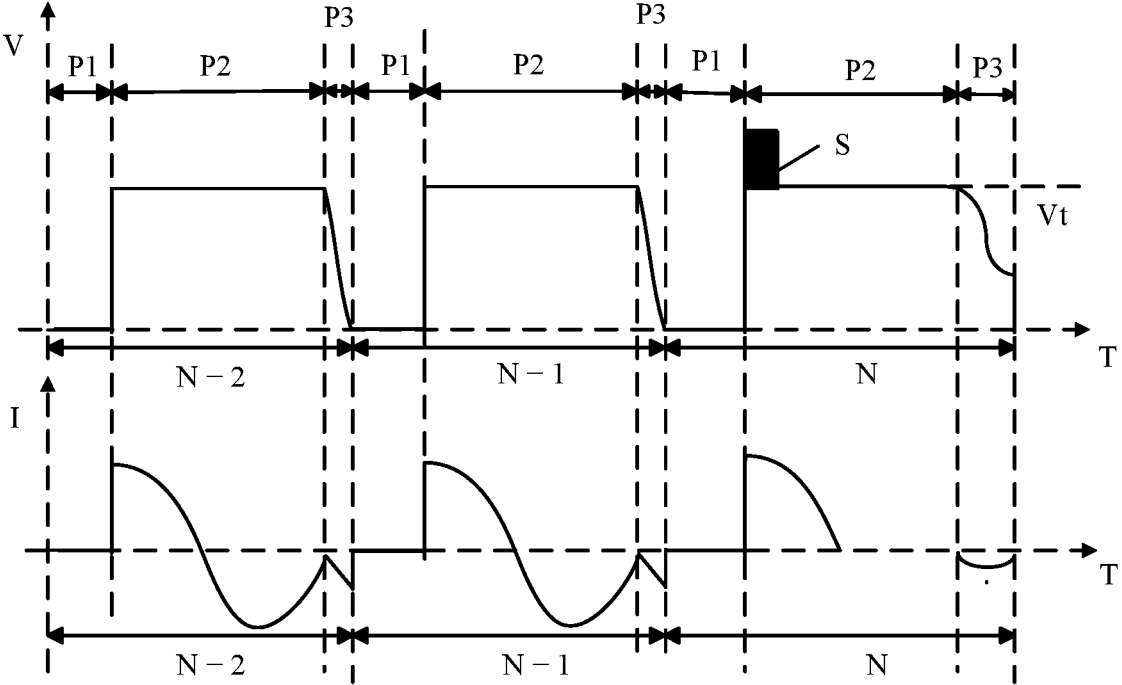
FIG. 6*b* shows another waveform graph (an upper half part) for a voltage Vds corresponding to a lower bridge switch and a cycle T, and another waveform graph (a lower half part) for a current of a clamp capacitor Cq and a cycle according to an embodiment of this application.

In some other embodiments of this application, as shown in FIG. 6b, that the sampling waveform in a current charging cycle is abnormal includes: After obtaining the sampling waveform, the controller 203 may calculate an integral area S (a part corresponding to a shadow part in the figure), in the second phase P2, that is of a part of the sampling waveform in the second phase P2 and that exceeds the voltage threshold Vth, where S>0. Similar to the foregoing, the voltage threshold Vth may be the platform voltage Vt (that is, a manner shown in FIG. 6b), or may be a value near the platform voltage Vt. This is not limited in this application. A setting manner is the same as that in the foregoing. Details are not described herein again.

In this case, the controller 203 may include an integration unit and a comparison unit. The integration unit is configured to integrate an area, and the comparison unit is configured to output a logic signal after comparing an integrated area value with zero, to drive the lower bridge drive circuit 205 to perform.

Figures 7A, 7B:
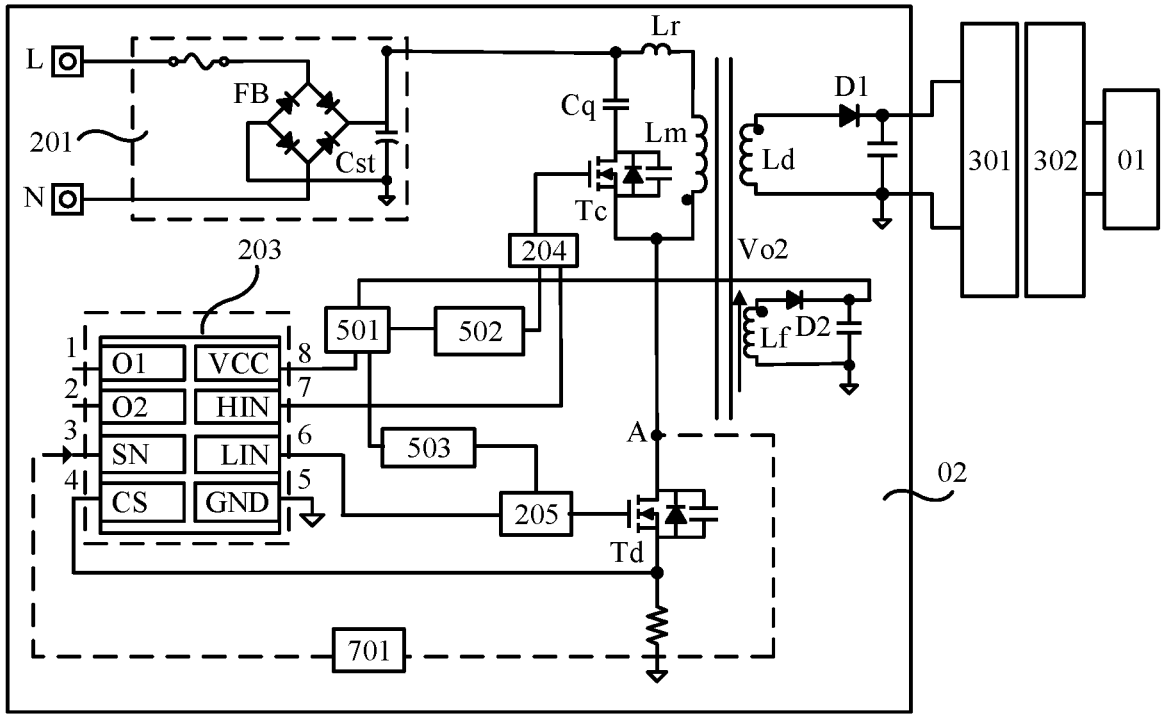
FIG. 7*a* is a schematic diagram of s structure of another charging apparatus according to an embodiment of this application.
FIG. 7*b* is a schematic diagram of a structure of a sampling circuit according to an embodiment of this application.

To obtain a waveform at the sampling point, the charging apparatus 02 may further include a sampling circuit 701 shown in FIG. 7a. One end of the sampling circuit 701 may be electrically connected to the controller 203, and the other end of the sampling circuit 701 may be electrically connected to the lower end of the primary coil Lm in the transformer 202 by using the sampling point A. The sampling circuit 701 is configured to buck a voltage at a location at which the sampling circuit 701 is electrically connected to the transformer 202, that is, at the sampling point A, and then provide a bucked voltage to the controller 203. It should be noted that if the voltage value at the sampling point does not exceed a voltage withstand value of the controller 203, the sampling circuit 701 may not be disposed. This is not limited in this application.

In some embodiments of this application, the sampling circuit 701 may include a first resistor R1 and a second resistor R2 that are shown in FIG. 7b. A first end (an upper end) of the first resistor R1 is electrically connected to the transformer 202, a first end (an upper end) of the second resistor R2 is electrically connected to a second end (a lower end) of the first resistor R1 and the controller 203, and a second end (a lower end) of the second resistor R2 is grounded. Based on this, a voltage value collected by the controller 203 may be changed by adjusting a ratio of a resistance value of the first resistor R1 to a resistance value of the second resistor R2, to ensure that the voltage value does not exceed the voltage withstand value of the controller. When the ratio of the resistance value of the first resistor R1 to the resistance value of the second resistor R2 is larger, the collected voltage value is smaller.

Figures 7C, 7D:
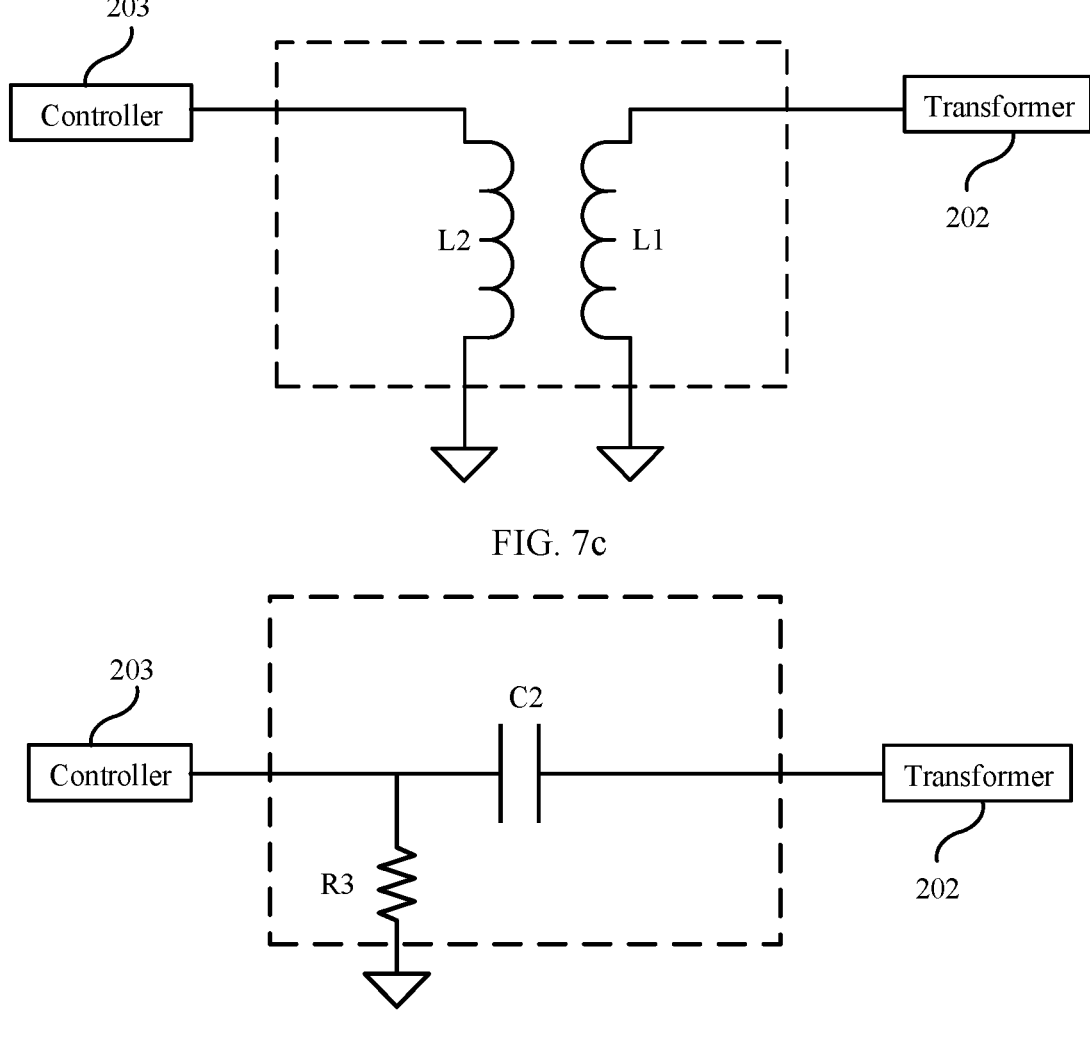
FIG. 7*c* is a schematic diagram of a structure of another sampling circuit according to an embodiment of this application.
FIG. 7*d* is a schematic diagram of a structure of another sampling circuit according to an embodiment of this application.

In some other embodiments of this application, the sampling circuit 701 may include a first coil L1 and a second coil L2 that are shown in FIG. 7c. A first end (an upper end) of the first coil L1 is electrically connected to the transformer 202, and a second end (a lower end) of the first coil L1 is grounded. A first end M of the second coil L2 is electrically connected to the controller 203, and the other end of the second coil L2 is grounded. In addition, to enable the sampling circuit 701 to provide a voltage bucking function, a quantity of turns of the first coil L1 is greater than a quantity of turns of the second coil L2. The voltage value collected by the controller 203 may be changed by controlling a ratio of the quantity of turns of the first coil L1 to the quantity of turns of the second coil L2. When the ratio of the quantity of turns of the first coil L1 to the quantity of turns of the second coil L2 is larger, the collected voltage value is smaller.

In some other embodiments of this application, the sampling circuit 701 may include a third resistor R3 and a second capacitor C2 that are shown in FIG. 7d. A first end (an upper end) of the third resistor R3 is electrically connected to the controller 203, and a second end (a lower end) of the third resistor R3 is grounded. A first end (a right end) of the second capacitor C2 is electrically connected to the transformer 202, and a second end (a left end) of the second capacitor C2 is electrically connected to the controller 203. The voltage value collected by the controller 203 may be changed by adjusting a capacitance value of the second capacitor C2 or a resistance value of the third resistor R3. When the capacitance value of the second capacitor C2 or the resistance value of the third resistor R3 is larger, the collected voltage value is larger.

It should be noted that the foregoing embodiments are merely several implementable examples of the sampling circuits 701. As long as the voltage bucking function can be implemented, another manner of disposing the sampling circuit 701 may also be adopted. This is not limited in this application.

Example 2

The same as Example 1, in this example, whether the foregoing sampling waveform is abnormal means whether the sampling waveform in the second phase P2 of the $N^{th}$ cycle is abnormal, so as to determine whether the upper bridge switch Tc is turned on. A difference from Example 1 is that, in this example, that the sampling waveform in a current charging cycle is abnormal includes: The controller

Figure 8A:
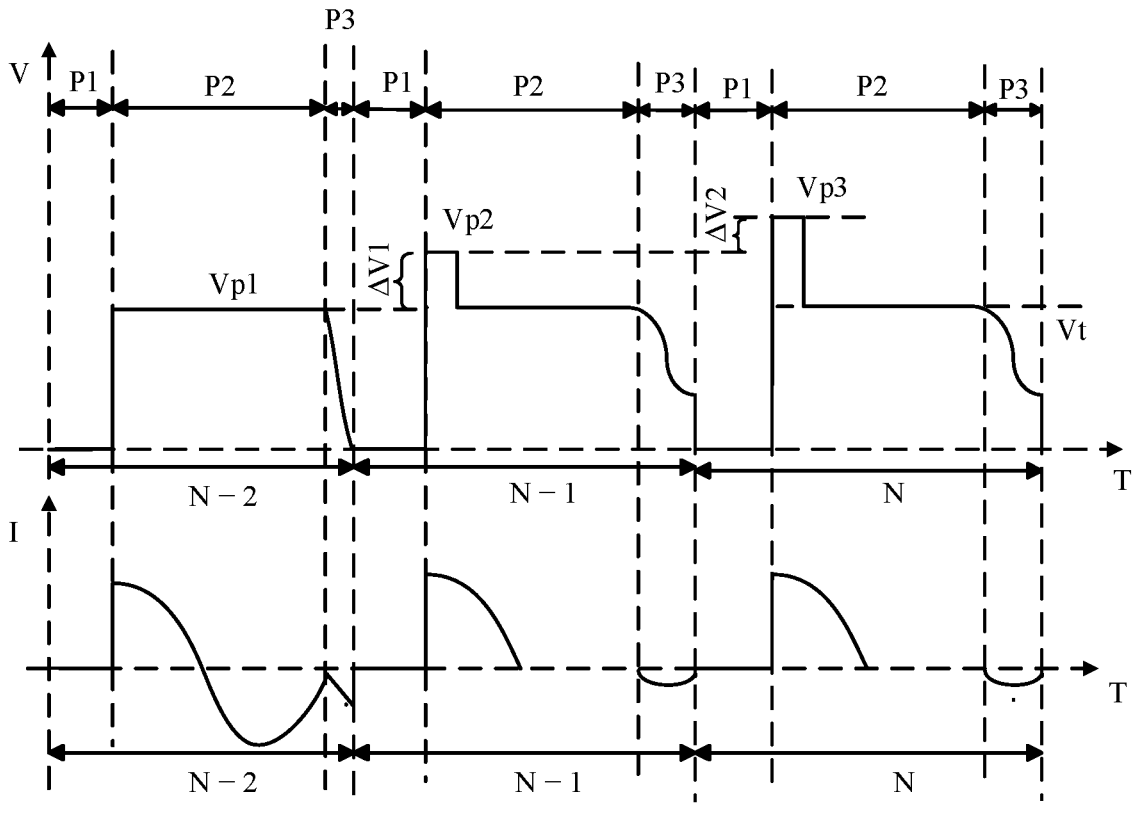
FIG. 8*a* shows another waveform graph (an upper half part) for a voltage Vds corresponding to a lower bridge switch and a cycle T, and another waveform graph (a lower half part) for a current of a clamp capacitor Cq and a cycle according to an embodiment of this application.

203 continuously obtains a peak voltage Vp of the sampling waveform in the second phase P2 of each of the $N^{th}$ charging cycle shown in FIG. 8a and M (as shown in the figure, M is 2) charging cycles before the $N^{th}$ charging cycle, and calculates a voltage difference ΔV between peak voltages Vp of the sampling waveform that are in two adjacent charging cycles and that are in the (M+1) peak voltages Vp, that is, $\Delta V = V p_n - V p_{n-1}$, and ΔV≠0. In this case, when ΔV≠0 in the foregoing calculation result, it may indicate that the sampling waveform in the second phase P2 of the current charging cycle (that is, the $N^{th}$ charging cycle) is abnormal, and the upper bridge switch Tc is not turned on in the second phase P2 of the $N^{th}$ charging cycle. A value of N is the same as the foregoing. M≥1, and M is a positive number. For example, if peak voltages of sampling waveforms are respectively Vp1, Vp2, and Vp3 in the second phases P2 of the $(N-2)^{th}$, the $(N-1)^{th}$, and the $N^{th}$ cycles, $$\Delta V2 = Vp3 - Vp2, \text{ and}$$

$$\Delta V1 = Vp2 - Vp1.$$

Because neither the ΔV1 nor the ΔV2 is zero, it may be determined that the waveform in the $N^{th}$ charging cycle is an abnormal waveform.

In some other embodiments of this application, a quotient of peak voltages Vp of sampling waveforms in two adjacent charging cycles may be calculated, that is, $W = V p_n / V p_{n-1}$. If the ratio W is not 1, it is determined that the sampling waveform is an abnormal waveform.

In this case, the controller 203 is configured to output a logic signal after performing calculation on the peak voltage Vp, to drive the lower bridge drive circuit 205 to perform an action. It should be noted that a specific calculation manner is not limited in this application, provided that an abnormal waveform can be determined.

Figure 8B:
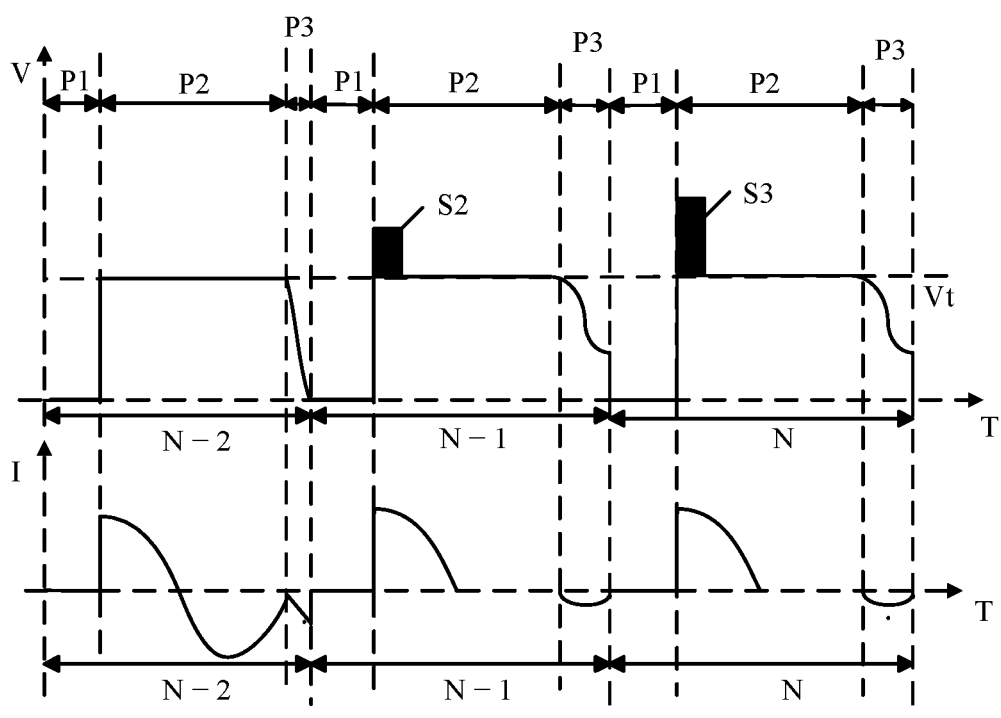
FIG. 8*b* shows another waveform graph (an upper half part) for a voltage Vds corresponding to a lower bridge switch and a cycle T, and another waveform graph (a lower half part) for a current of a clamp capacitor Cq and a cycle according to an embodiment of this application.

In some other embodiments of this application, as shown in FIG. 8b, that the sampling waveform in a current charging cycle is abnormal includes: The controller 203 may continuously obtain an integral area S that is in the second phase and that is of a part exceeding the voltage threshold Vth in the second phase P2 of the $N^{th}$ charging cycle and in a second phase of each of M (as shown in the figure, M is 2) charging cycles before the $N^{th}$ charging cycle. In addition, the controller 203 calculates an area difference ΔS between integral areas S that are in two adjacent charging cycles and that are in the (M+1) integral areas S ((M+1) refers to the $N^{th}$ charging cycle and the M charging cycles before the $N^{th}$ charging cycle, as shown in FIG. 8b, (M+1) is 3), that is, $\Delta S = S_n - S_{n-1}$, and ΔS≠0. In this case, when ΔS≠0 in the foregoing calculation result, it may indicate that the sampling waveform in the second phase P2 of the current charging cycle (that is, the $N^{th}$ charging cycle) is abnormal, and the upper bridge switch Tc is not turned on in the second phase P2 of the $N^{th}$ charging cycle.

M>1, and M is an integer. It should be noted that the voltage threshold Vth may be the platform voltage Vt (this is used as an example in the figure), or may be a value near the platform voltage Vt. This is not limited in this application. A specific setting manner is the same as that in Example 1, and details are not described herein again.

For example, if integral areas S of sampling waveforms are respectively S1, S2, and S3 in the second phases P2 of the $(N-2)^{th}$, the $(N-1)^{th}$, and the $N^{th}$ cycles, $$\Delta S1 = S2 - S1 = S2, \text{ and}$$

$$\Delta S2 = S3 - S2.$$

Because neither ΔS1 nor ΔS2 is zero, it may be determined that the waveform in the $N^{th}$ charging cycle is an abnormal waveform.

In some other embodiments of this application, the sum of integral areas S in two adjacent charging cycles may be calculated, that is, $N=S_n+S_{n-1}$. If the sum N is not 0, it is determined that the sampling waveform is an abnormal waveform.

Similar to the foregoing, a specific calculation manner is not limited in this application, provided that an abnormal waveform can be determined.

In this case, the controller 203 may include an integration unit and a processing unit. The integration unit is configured to integrate an area, and the processing unit is configured to output a logic signal after performing calculation on an integrated area value, to drive the lower bridge drive circuit 205 to perform an action.

In this example, the foregoing sampling circuit may also be disposed. A manner of disposing the sampling circuit is the same as that in the foregoing, and details are not described herein again.

Example 3

Figure 8C:
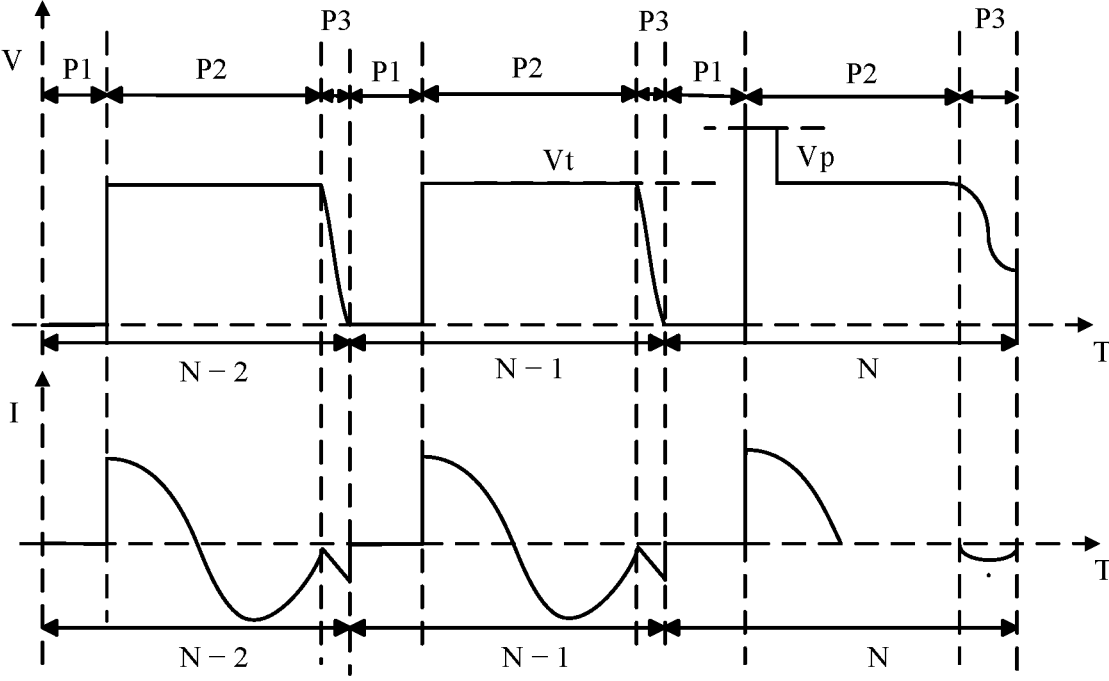
FIG. 8*c* shows another waveform graph (an upper half part) for a voltage Vds corresponding to a lower bridge switch and a cycle T, and another waveform graph (a lower half part) for a current of a clamp capacitor Cq and a cycle according to an embodiment of this application.

The same as Example 1, in this example, whether the foregoing sampling waveform is abnormal means whether the sampling waveform in the second phase P2 of the $N^{th}$ cycle is abnormal, so as to determine whether the upper bridge switch Tc is turned on. A difference from Example 1 is that, in this example, as shown in FIG. 8c, that the third sampling waveform in a current charging cycle is abnormal includes: The controller 203 obtains a platform voltage Vt of the sampling waveform in the second phase P2 of the $(N-1)^{th}$ charging cycle and a peak voltage Vp of the sampling waveform in the second phase P2 of the $N^{th}$ charging cycle, where Vp>Vt. As shown in FIG. 8c, when the peak voltage Vp of the sampling waveform in the second phase P2 of the current charging cycle, that is, the $N^{th}$ charging cycle, meets Vp>Vt, it may be learned that the waveform in the $N^{th}$ charging cycle is an abnormal waveform. N≥2, and N is a positive integer.

In this case, the controller 203 is configured to output a logic signal after obtaining and comparing the peak voltage Vp with the platform voltage Vt, to drive the lower bridge drive circuit 205 to perform an action.

In this example, the foregoing sampling circuit may also be disposed. A manner of disposing the sampling circuit is the same as that in the foregoing, and details are not described herein again.

Example 4

Figure 8D:
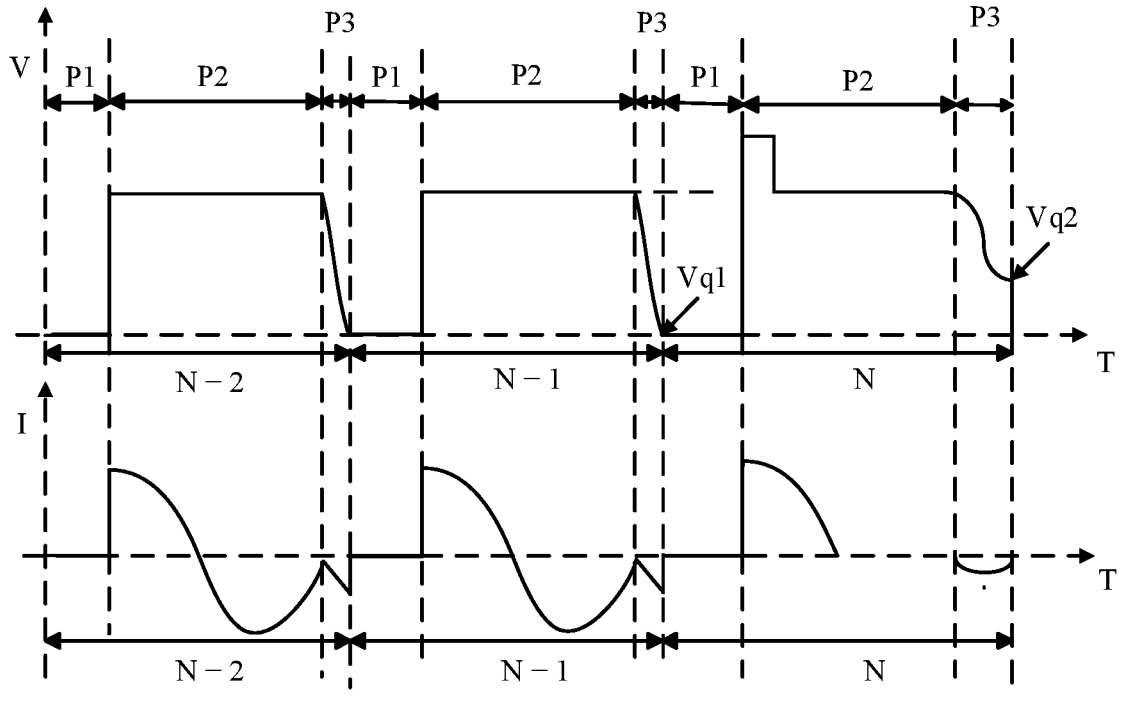
FIG. 8*d* shows another waveform graph (an upper half part) for a voltage Vds corresponding to a lower bridge switch and a cycle T, and another waveform graph (a lower half part) for a current of a clamp capacitor Cq and a cycle according to an embodiment of this application.

The same as Example 1, in this example, whether the foregoing sampling waveform is abnormal means whether the sampling waveform in the second phase P2 of the $N^{th}$ cycle is abnormal, so as to determine whether the upper bridge switch Tc is turned on. A difference from Example 1 is that, in this example, as shown in FIG. 8d, that the sampling waveform in a current charging cycle is abnormal includes: The controller 203 learns that a voltage Vq of the sampling waveform is greater than or equal to the voltage threshold Vth (for example, 30 V) at an end of the third phase P3 of the $N^{th}$ charging cycle (that is, a start end of the first phase P1 of the $(N+1)^{th}$ charging cycle). When the voltage Vq of the sampling waveform is greater than 30 V at the end of the third phase P3, loss is relatively large when the lower bridge switch Td is turned on.

For example, in FIG. 8d, a voltage at the end of the third phase P3 of the $N^{th}$ charging cycle is Vq2, and a voltage at an end of the third phase P3 of in the $(N-1)^{th}$ charging cycle is Vq1. Vq2>30 V, and Vq1=0 V. Therefore, a waveform corresponding to the current charging cycle, that is, the $N^{th}$ charging cycle, is an abnormal waveform, and a waveform corresponding to the $(N-1)^{th}$ charging cycle is normal waveform. A value of N is the same as the foregoing.

In a case of a normal waveform, the voltage at the end of the third phase P3 of the $N^{th}$ charging cycle (that is, a start end of the first phase P1 of the $(N+1)^{th}$ charging cycle) generates a negative current at a location of the primary coil Lm because the upper bridge switch Tc is turned on. Under action of the current, power in a parasitic capacitor in the lower bridge switch Td is removed, so that the voltage value of the sampling waveform rapidly drops to 0 or approaches 0. However, in a case of an abnormal waveform, the upper bridge switch Tc is turned off, and the negative current does not exist, so that the voltage at the end of the third phase P3 of the $N^{th}$ charging cycle is relatively high. Therefore, the voltage value at the end of the third phase P3 of the $N^{th}$ charging cycle may be detected to determine whether the sampling waveform in the current charging cycle is an abnormal waveform. In addition, the voltage threshold Vth is not limited in this application, and may be set based on a requirement.

In this case, the controller 203 may include a comparator. The comparator outputs a logic signal after comparing the voltage Vq of the sampling waveform at the end of the third phase P3 with the voltage threshold Vth (for example, 30 V), to drive the lower bridge drive circuit 205 to perform an action.

Figure 9A:
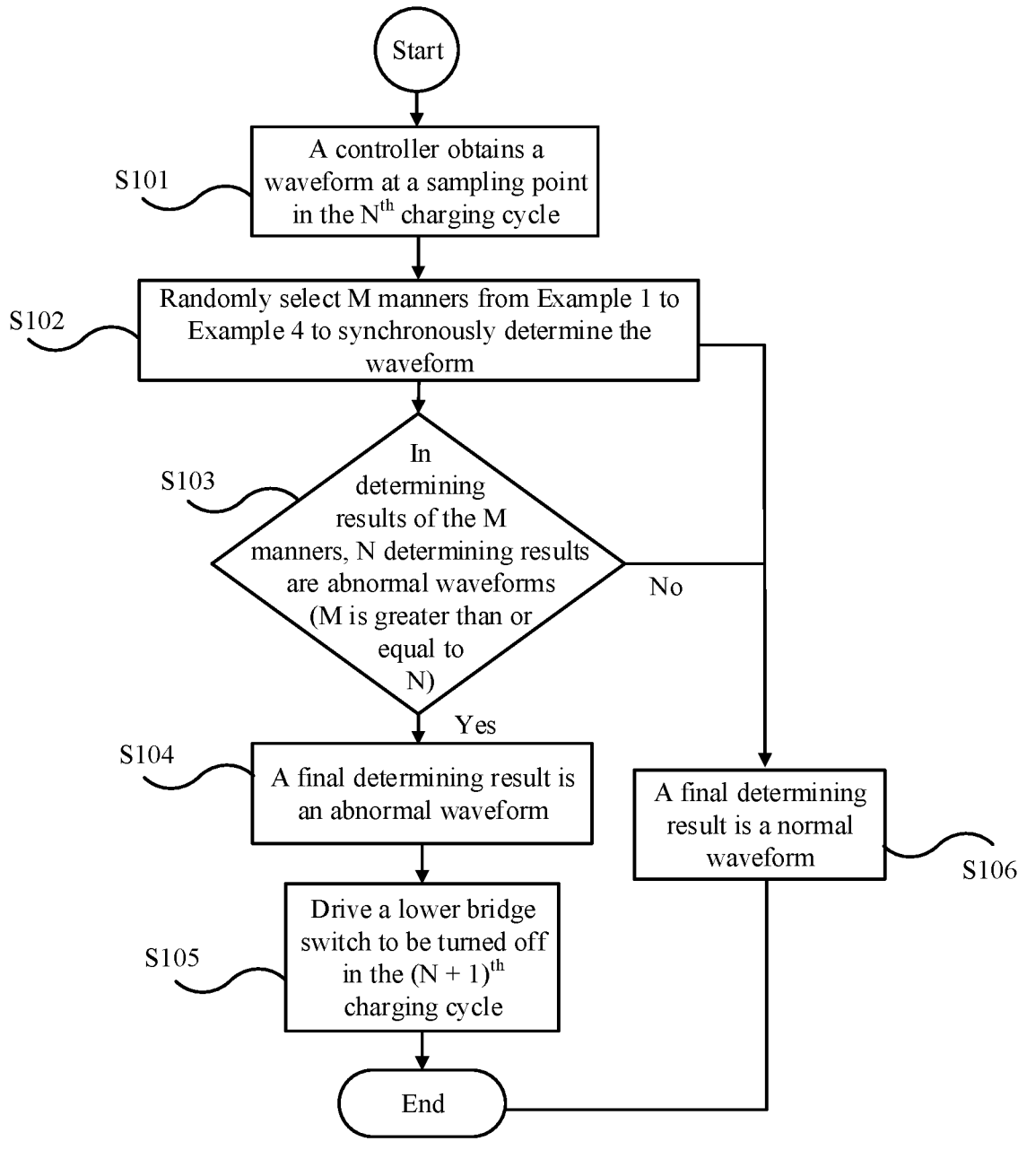
FIG. 9*a* is a flowchart of a waveform determining method according to an embodiment of this application.

In some other embodiments of this application, at least two of the foregoing four manners may be selected for mixed use. For example, as shown in FIG. 9a, a waveform determining method may include the following steps.

S101. The controller 203 obtains a waveform at a sampling point in the $N^{th}$ charging cycle, where N is an integer.

S102. Randomly select M manners from Example 1 to Example 4 to synchronously determine the waveform. M is greater than or equal to 2, and M is an integer. Example 1 is a manner of comparing a peak voltage Vp or an integral area S of a waveform in a same cycle with a threshold. Example 2 is a manner of performing calculation on peak voltages Vp or integral areas S of waveforms in at least two consecutive cycles and then comparing a calculation result with a threshold. Example 3 is a manner of comparing a platform voltage Vt in a current cycle with a peak voltage Vp in a next cycle. Example 4 is a manner of comparing a voltage Vq at an end of the third phase P3 of a charging cycle with a threshold. For example, three manners that are respectively in Example 1, Example 2, and Example 3 may be selected for synchronous determining.

S103. In determining results of the M manners, N determining results are abnormal waveforms. (M is greater than or equal to N.) For example, the foregoing M manners are determined, and several of the M manners are checked, for example, N determining results all are abnormal waveforms.

S104. A final determining result is an abnormal waveform.

If the N determining results are abnormal waveforms, the final determining result is an abnormal waveform. For example, if N is 3 and three determining results all are abnormal waveforms, the final determining result is an abnormal waveform.

S105. Drive the lower bridge switch Td to be turned off in the $(N+1)^{th}$ charging cycle.

S106. A final determining result is a normal waveform.

If a quantity of determining results that are abnormal waveforms is less than N (less than 3), the final determining result is a normal waveform. It should be noted that values of M and N may be set based on a requirement. This is not limited in this application.

Figure 9B:
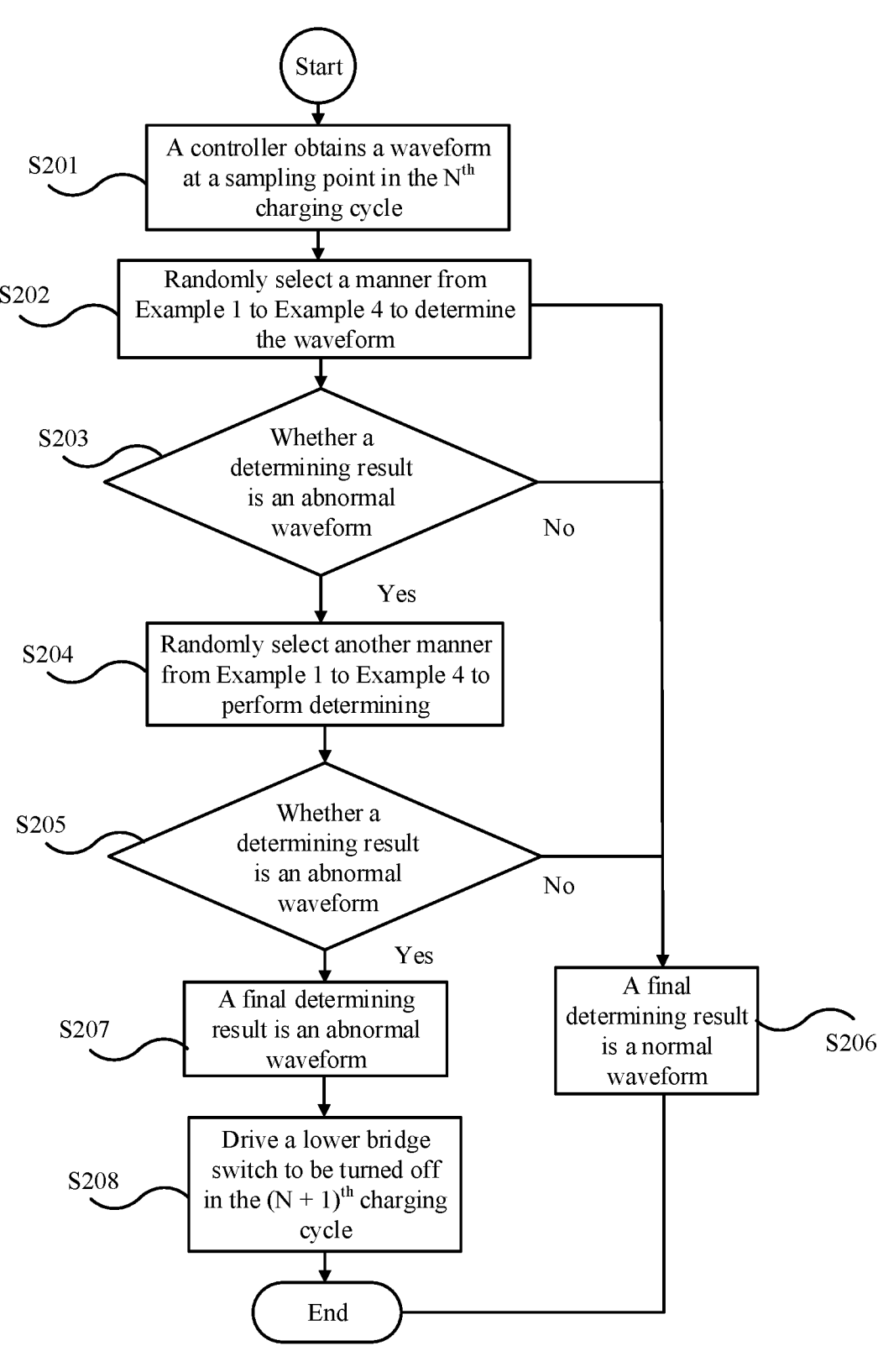
FIG. 9*b* is a flowchart of another waveform determining method according to an embodiment of this application.

In addition, for another example, as shown in FIG. 9*b*, a waveform determining method may include the following steps.

S201. The controller 203 obtains a waveform at a sampling point in the $N^{th}$ charging cycle, where N is an integer.

S202. Randomly select a manner from Example 1 to Example 4 to determine the waveform. Example 1 is a manner of comparing a peak voltage Vp or an integral area S of a waveform in a same cycle with a threshold. Example 2 is a manner of performing calculation on peak voltages Vp or integral areas S of waveforms in at least two consecutive cycles and then comparing a calculation result with a threshold. Example 3 is a manner of comparing a platform voltage Vt in a current cycle with a peak voltage Vp in a next cycle. Example 4 is a manner of comparing a voltage Vq at an end of the third phase P3 of a charging cycle with a threshold. For example, the manner in Example 1 may be selected for determining.

S203. Check whether a determining result is an abnormal waveform. Specifically, the manner in S202 is determined to check whether the determining result is an abnormal waveform.

S204. Randomly select another manner from Example 1 to Example 4 to perform determining. If the determining result in S203 is an abnormal waveform, another manner is triggered for determining. For example, the manner in Example 2 is selected for determining again.

S205. Check whether a determining result is an abnormal waveform. Specifically, after step S204 is performed, it is checked whether the determining result is an abnormal waveform.

S206. A final determining result is a normal waveform. Specifically, if the determining results in S203 and S205 are normal waveforms, the final determining result is a normal waveform.

S207. A final determining result is an abnormal waveform. If the determining result in S205 is an abnormal waveform, the final determining result is an abnormal waveform.

S208. Drive the lower bridge switch Td to be turned off in the $(N+1)^{th}$ charging cycle.

It should be noted that specific methods that are mixed for use are not limited in this application, provided that the foregoing methods can be mixed to determine that a result is an abnormal waveform.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

22

What is claimed is:

1. A charging apparatus, configured to supply power to a load, wherein the charging apparatus comprises:

a rectifier circuit configured to rectify a received alternating current;

a transformer configured to buck an output voltage of the rectifier circuit and then provide a bucked output voltage to the load, wherein the transformer comprises a primary coil and at least one secondary coil, and a first end of the primary coil is electrically connected to the rectifier circuit;

a lower bridge switch, wherein a first end of the lower bridge switch is electrically connected to a second end of the primary coil, a second end of the lower bridge switch is grounded, and the lower bridge switch is configured to be turned on in a first phase of a charging cycle of the charging apparatus, wherein a current output by the rectifier circuit is transmitted to the primary coil to charge the primary coil;

a clamp capacitor, wherein a first end of the clamp capacitor is electrically connected to the first end of the primary coil;

an upper bridge switch, wherein a first end of the upper bridge switch is electrically connected to a second end of the clamp capacitor, a second end of the upper bridge switch is electrically connected to the second end of the primary coil, and the upper bridge switch is configured to be turned on in a second phase of the charging cycle, wherein a leakage inductance in the primary coil charges the clamp capacitor, and the clamp capacitor discharges electricity to the primary coil; and a controller, configured to control, in the first phase and the second phase, the upper bridge switch and the lower bridge switch to be alternatively turned on, wherein the controller is further configured to:

when the lower bridge switch is turned off, obtain a sampling waveform at a location at which the controller is electrically connected to the transformer; and when the sampling waveform in a current charging cycle is abnormal, turn off the lower bridge switch in a first phase of a next charging cycle, wherein the sampling waveform comprises a voltage waveform of the primary coil or a voltage waveform of the secondary coil.

2. The charging apparatus according to claim 1, wherein the location at which the controller is electrically connected to the transformer is one of:

between the second end of the primary coil and the first end of the lower bridge switch; or between the second end of the upper bridge switch and the first end of the lower bridge switch.

3. The charging apparatus according to claim 1, wherein:

the transformer comprises a first secondary coil, and the transformer further comprises a first rectifier diode;

a first end of the first secondary coil is electrically connected to an anode of the first rectifier diode, wherein a cathode of the first rectifier diode is configured to be electrically connected to the load, and a second end of the first secondary coil is grounded;

the first secondary coil and the primary coil are configured to buck a voltage of the primary coil through electromagnetic induction, and generate a first output voltage; and the location at which the controller is electrically connected to the transformer is at the first end of the first secondary coil.

4. The charging apparatus according to claim 3, wherein the charging apparatus further comprises a power supply circuit, and the power supply circuit is electrically connected to the controller and configured to supply power to the controller;

the transformer further comprises a second secondary coil and a second rectifier diode;

a first end of the second secondary coil is electrically connected to an anode of the second rectifier diode, a cathode of the second rectifier diode is electrically connected to the power supply circuit, and a second electrode of the second secondary coil is grounded; the second secondary coil and the primary coil are configured to buck the voltage of the primary coil through electromagnetic induction, and generate a second output voltage, wherein the second output voltage is used to supply power to the power supply circuit; and the location at which the controller is electrically connected to the transformer is at the first end of the second secondary coil.

5. The charging apparatus according to claim 1, wherein that the sampling waveform in a current charging cycle is abnormal comprises:

obtaining, by the controller, a platform voltage Vt of the sampling waveform in a second phase of an $N^{th}$ charging cycle, and detecting, in the second phase, that a peak voltage Vp of the sampling waveform is greater than the platform voltage Vt; or calculating, in the second phase, an integral area S, in the second phase, that is of a part of the sampling waveform and that exceeds the platform voltage Vt, wherein $S>0$, $N\geq1$, and N is a positive number.

6. The charging apparatus according to claim 1, wherein that the sampling waveform in a current charging cycle is abnormal comprises:

obtaining, by the controller, a platform voltage Vt of the sampling waveform in a second phase of an $N^{th}$ charging cycle;

continuously obtaining an integral area S that is in the second phase and that is of a part exceeding the platform voltage Vt in the second phase of the $N^{th}$ charging cycle and in a second phase of each of M charging cycles before the $N^{th}$ charging cycle; and calculating an area difference $\Delta S$ between integral areas S that are in two adjacent charging cycles and that are in the (M+1) integral areas S, wherein $\Delta S\neq0$, $N\geq1$, N is a positive number, $M\geq1$, and M is a positive number.

7. The charging apparatus according to claim 1, wherein that the sampling waveform in a current charging cycle is abnormal comprises:

obtaining, by the controller, a platform voltage Vt of the sampling waveform in a second phase of an $(N-1)^{th}$ charging cycle; and obtaining a peak voltage Vp of the sampling waveform in a second phase of an $N^{th}$ charging cycle, wherein $Vp>Vt$, $N\geq2$, and N is a positive number.

8. The charging apparatus according to claim 5, wherein when the controller is electrically connected to the primary coil, the platform voltage is $Vt=(Vo+Vo1\times T1)$, wherein Vo is the output voltage of the rectifier circuit, Vo1 is the output voltage provided by the transformer to the load, and T1 is a ratio of a quantity of turns of the primary coil in the transformer to a quantity of turns of a secondary coil configured to supply power to the load; or when the controller is electrically connected to the secondary coil, the platform voltage is $Vt=-Vo/T2$, wherein T2 is a ratio of a quantity of turns of the primary coil in the transformer to a quantity of turns of the secondary coil electrically connected to the controller.

9. The charging apparatus according to claim 1, wherein that the sampling waveform in a current charging cycle is abnormal comprises:

continuously obtaining, by the controller, a peak voltage Vp of the sampling waveform in a second phase of an $N^{th}$ charging cycle and in a second phase of each of M charging cycles before the $N^{th}$ charging cycle; and calculating a voltage difference $\Delta V$ between peak voltages Vp of the sampling waveform that are in two adjacent charging cycles and that are in the (M+1) peak voltages Vp, wherein $\Delta V\neq0$, $N\geq1$, N is a positive number, $M\geq1$, and M is a positive number.

10. The charging apparatus according to claim 1, wherein that the sampling waveform in a current charging cycle is abnormal comprises:

learning, by the controller, that a voltage of the sampling waveform is greater than or equal to 30 V at an end of a third phase of an $N^{th}$ charging cycle, wherein $N\geq1$, and N is a positive number.

11. The charging apparatus according to claim 1, wherein the charging apparatus further comprises:

a sampling circuit, electrically connected between the controller and the transformer, wherein the sampling circuit is configured to buck a voltage at a location at which the sampling circuit is electrically connected to the transformer and then provide a bucked voltage to the controller.

12. The charging apparatus according to claim 11, wherein the sampling circuit comprises:

a first resistor, wherein a first end of the first resistor is electrically connected to the transformer; and a second resistor, wherein a first end of the second resistor is electrically connected to a second end of the first resistor and the controller, and a second end of the second resistor is grounded.

13. The charging apparatus according to claim 11, wherein the sampling circuit comprises:

a first coil, wherein a first end of the first coil is electrically connected to the transformer, and a second end of the first coil is grounded;

a second coil, wherein a first end of the second coil is electrically connected to the controller, and the other end of the second coil is grounded; and a quantity of turns of the first coil is greater than a quantity of turns of the second coil.

14. The charging apparatus according to claim 11, wherein the sampling circuit comprises:

a third resistor, wherein a first end of the third resistor is electrically connected to the controller, and a second end of the third resistor is grounded; and a second capacitor, wherein a first end of the second capacitor is electrically connected to the transformer, and a second end of the second capacitor is electrically connected to the controller.

15. A charging system, comprising an electronic device and the charging apparatus, wherein the electronic device comprises a battery, and the battery is electrically connected to the charging apparatus, wherein the charging apparatus comprises:

a rectifier circuit configured to rectify a received alternating current;

a transformer configured to buck an output voltage of the rectifier circuit and then provide a bucked output voltage to the load, wherein the transformer comprises a primary coil and at least one secondary coil, and a first end of the primary coil is electrically connected to the rectifier circuit;

a lower bridge switch, wherein a first end of the lower bridge switch is electrically connected to a second end of the primary coil, a second end of the lower bridge switch is grounded, and the lower bridge switch is configured to be turned on in a first phase of a charging cycle of the charging apparatus, wherein a current output by the rectifier circuit is transmitted to the primary coil to charge the primary coil;

a clamp capacitor, wherein a first end of the clamp capacitor is electrically connected to the first end of the primary coil;

an upper bridge switch, wherein a first end of the upper bridge switch is electrically connected to a second end of the clamp capacitor, a second end of the upper bridge switch is electrically connected to the second end of the primary coil, and the upper bridge switch is configured to be turned on in a second phase of the charging cycle, wherein a leakage inductance in the primary coil charges the clamp capacitor, and the clamp capacitor discharges electricity to the primary coil; and a controller, configured to control, in the first phase and the second phase, the upper bridge switch and the lower bridge switch to be alternatively turned on, wherein the controller is further configured to:

when the lower bridge switch is turned off, obtain a sampling waveform at a location at which the controller is electrically connected to the transformer; and when the sampling waveform in a current charging cycle is abnormal, turn off the lower bridge switch in a first phase of a next charging cycle, wherein the sampling waveform comprises a voltage waveform of the primary coil or a voltage waveform of the secondary coil.

16. A charging apparatus control method, wherein the charging apparatus control method is applied to a charging apparatus, and the charging apparatus comprises:

a rectifier circuit, a transformer, a lower bridge switch, a clamp capacitor, an upper bridge switch, and a controller, wherein:

the transformer comprises a primary coil and at least one secondary coil; a first end of the primary coil is electrically connected to the rectifier circuit; the controller is electrically connected to the transformer;

a first end of the lower bridge switch is electrically connected to a second end of the primary coil, and a second end of the lower bridge switch is electrically connected to a grounding end; a first end of the clamp capacitor is electrically connected to the first end of the primary coil; and a first end of the upper bridge switch is electrically connected to a second end of the clamp capacitor, and a second end of the upper bridge switch is electrically connected to the second end of the primary coil; and the charging apparatus control method comprises:

controlling, by the controller in a first phase of a charging cycle of the charging apparatus, the lower bridge switch to be turned on and the upper bridge switch to be turned off, wherein a current output by the rectifier circuit charges the primary coil; and controlling, by the controller in a second phase of the charging cycle, the lower bridge switch to be turned off and the upper bridge switch to be turned on, wherein the primary coil discharges electricity, the transformer bucks an output voltage of the rectifier circuit and provides a bucked output voltage to a load, a leakage inductance in the primary coil charges the clamp capacitor, and when the leakage inductance has no current to output, the clamp capacitor discharges electricity to the primary coil; and the charging apparatus control method further comprises waveform processing comprising:

obtaining, by the controller in the second phase of the charging cycle, a sampling waveform at a location at which the controller is electrically connected to the transformer, wherein the sampling waveform comprises a voltage waveform of the primary coil or a voltage waveform of the secondary coil; and when the sampling waveform in a current charging cycle is abnormal, turning off, by the controller, the lower bridge switch in a first phase of a next charging cycle.

17. The charging apparatus control method according to claim 16, wherein that the sampling waveform in a current charging cycle is abnormal comprises:

obtaining, by the controller, a platform voltage Vt of the sampling waveform in a second phase of the $N^{th}$ charging cycle, and detecting, in the second phase, that a peak voltage Vp of the sampling waveform is greater than the platform voltage Vt; or calculating, in the second phase, an integral area S, in the second phase, that is of a part of the sampling waveform and that exceeds the platform voltage Vt, wherein S>0, N≥1, and N is a positive number.

18. The charging apparatus control method according to claim 16, wherein that the sampling waveform in a current charging cycle is abnormal comprises:

obtaining, by the controller, a platform voltage Vt of the sampling waveform in a second phase of an $N^{th}$ charging cycle; continuously obtaining an integral area S that is in the second phase and that is of a part exceeding the platform voltage Vt in the second phase of the $N^{th}$ charging cycle and in a second phase of each of M charging cycles before the $N^{th}$ charging cycle; and calculating an area difference ΔS between integral areas S that are in two adjacent charging cycles and that are in the (M+1) integral areas S, wherein ΔS≠0, N≥1, N is a positive number, M≥1, and M is a positive number.

19. The charging apparatus control method according to claim 16, wherein that the sampling waveform in a current charging cycle is abnormal comprises:

obtaining, by the controller, a platform voltage Vt of the sampling waveform in a second phase of the $(N-1)^{th}$ charging cycle; and obtaining a peak voltage Vp of the sampling waveform in a second phase of the $N^{th}$ charging cycle, wherein Vp>Vt, N≥2, and N is a positive number.

20. The charging apparatus control method according to claim 17, wherein:

when the controller is electrically connected to the primary coil, the platform voltage is Vt=(Vo+Vo1×T1), wherein Vo is the output voltage of the rectifier circuit, Vo1 is the output voltage provided by the transformer to the load, and T1 is a ratio of a quantity of turns of the primary coil in the transformer to a quantity of turns of a secondary coil configured to supply power to the load; or when the controller is electrically connected to the secondary coil, the platform voltage is $Vt=-Vo/T2$, wherein $T2$ is a ratio of a quantity of turns of the primary coil in the transformer to a quantity of turns of the secondary coil electrically connected to the controller.

\* \* \* \* \*